(12) United States Patent
Kim et al.

(10) Patent No.: US 11,772,543 B2
(45) Date of Patent: Oct. 3, 2023

(54) LIGHTING APPARATUS FOR VEHICLE AND CONTROL METHOD THEREOF

(71) Applicant: HYUNDAI MOBIS CO., LTD., Seoul (KR)

(72) Inventors: Do Hyung Kim, Yongin-si (KR); Soon Mo Lee, Yongin-si (KR); Moo Kwan Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/835,376

(22) Filed: Jun. 8, 2022

(65) Prior Publication Data

US 2022/0396198 A1    Dec. 15, 2022

(30) Foreign Application Priority Data

Jun. 11, 2021    (KR) .................. 10-2021-0076149

(51) Int. Cl.
   *B60Q 1/068*    (2006.01)
   *G06V 20/58*    (2022.01)
   (Continued)

(52) U.S. Cl.
   CPC ............. *B60Q 1/068* (2013.01); *B60Q 1/085* (2013.01); *B60Q 1/381* (2022.05); *B60W 50/14* (2013.01);
   (Continued)

(58) Field of Classification Search
   CPC ....... F21V 14/08; F21S 41/689; F21S 41/692; F21S 41/1438; F21S 41/683; G06V 20/58;
   (Continued)

(56) References Cited

U.S. PATENT DOCUMENTS

| 11,607,988 B2 * | 3/2023 | Kim ..................... F21S 41/255 |
| 2004/0252518 A1 * | 12/2004 | Iwai ..................... B60Q 1/2665 |
| | | 362/487 |

(Continued)

FOREIGN PATENT DOCUMENTS

| CA | 2170842 A1 | 9/1997 |
| DE | 102009039038 A1 | 3/2011 |

(Continued)

OTHER PUBLICATIONS

Machine translation of JP 2015033897 A retrieved from the FIT database of PE2E search. (Year: 2023).*

(Continued)

*Primary Examiner* — Colin J Cattanach
(74) *Attorney, Agent, or Firm* — NovoTechIP International PLLC

(57) ABSTRACT

A control method of a lighting apparatus for a vehicle may include: sensing, by a sensing unit, a distance between the vehicle and a pedestrian; determining, by a control unit, whether the distance between the vehicle and the pedestrian falls within a first distance; determining, by the control unit, a walking direction of the pedestrian when the distance between the vehicle and the pedestrian falls within the first distance; and indicating, by the control unit, the walking direction to the pedestrian by operating a plurality of flap units.

12 Claims, 25 Drawing Sheets

(51) Int. Cl.
  *B60Q 1/08* (2006.01)
  *B60W 50/14* (2020.01)
  *F21S 41/692* (2018.01)
  *F21S 41/689* (2018.01)
  *F21S 41/683* (2018.01)
  *B60Q 1/38* (2006.01)
  *B60R 11/04* (2006.01)
  *H05B 45/44* (2020.01)
  *G09F 9/302* (2006.01)
  *G09F 9/37* (2006.01)
  *G09F 9/33* (2006.01)
  *F21V 14/08* (2006.01)
  *G09F 9/00* (2006.01)
  *B60Q 1/14* (2006.01)
  *G09F 9/30* (2006.01)
  *B60Q 1/36* (2006.01)

(52) U.S. Cl.
  CPC ........... *F21S 41/683* (2018.01); *F21S 41/689* (2018.01); *F21S 41/692* (2018.01); *G06V 20/58* (2022.01); *B60Q 1/1438* (2013.01); *B60Q 1/36* (2013.01); *B60Q 2300/45* (2013.01); *B60Q 2400/40* (2013.01); *B60Q 2900/00* (2013.01); *B60Q 2900/40* (2022.05); *B60R 11/04* (2013.01); *B60W 2420/52* (2013.01); *F21V 14/08* (2013.01); *G09F 9/00* (2013.01); *G09F 9/30* (2013.01); *G09F 9/302* (2013.01); *G09F 9/3023* (2013.01); *G09F 9/33* (2013.01); *G09F 9/37* (2013.01); *G09F 9/372* (2013.01); *G09F 9/375* (2013.01); *G09F 9/377* (2013.01); *H05B 45/44* (2020.01)

(58) Field of Classification Search
  CPC ........................... B60Q 2400/40; B60Q 1/381; B60Q 2900/00; B60Q 1/1438; B60Q 2300/45; B60Q 1/36; B60Q 2900/40; G09F 9/00; G09F 9/30; G09F 9/302; G09F 9/3023; G09F 9/33; G09F 9/37; G09F 9/372; G09F 9/375; G09F 9/377; H05B 45/44

See application file for complete search history.

(56) References Cited

U.S. PATENT DOCUMENTS

| | | | | |
|---|---|---|---|---|
| 2009/0066255 | A1* | 3/2009 | Nakayama | B60Q 3/217 |
| | | | | 315/77 |
| 2013/0264940 | A1* | 10/2013 | Starkey | E02F 9/0833 |
| | | | | 315/77 |
| 2014/0063834 | A1* | 3/2014 | Guan | F21S 41/657 |
| | | | | 362/523 |
| 2014/0218212 | A1* | 8/2014 | Nykerk | B60Q 1/50 |
| | | | | 340/901 |
| 2017/0089538 | A1* | 3/2017 | Wasilewski | F21S 41/657 |
| 2017/0129393 | A1* | 5/2017 | Johnson | F21S 41/692 |
| 2017/0210285 | A1 | 7/2017 | Kobayashi et al. | |
| 2019/0016254 | A1* | 1/2019 | Salter | F21V 9/30 |
| 2020/0173622 | A1* | 6/2020 | Fritzon | B60Q 1/05 |
| 2021/0129745 | A1* | 5/2021 | Cha | B60Q 1/2607 |
| 2021/0312840 | A1* | 10/2021 | Kim | G09F 9/37 |
| 2022/0258663 | A1* | 8/2022 | Nagase | G07C 9/00309 |

FOREIGN PATENT DOCUMENTS

| | | |
|---|---|---|
| DE | 102013217597 A1 | 3/2015 |
| DE | 102019128342 A1 | 4/2021 |
| DE | 102019129397 A1 | 5/2021 |
| FR | 3067478 A1 | 12/2018 |
| JP | 2015033897 A * | 2/2015 |
| KR | 20150072082 A | 6/2015 |
| KR | 10-1789652 B1 | 10/2017 |

OTHER PUBLICATIONS

Extended European Search Report dated Oct. 18, 2022 in the corresponding European Patent Application No. 22167085.4.

* cited by examiner

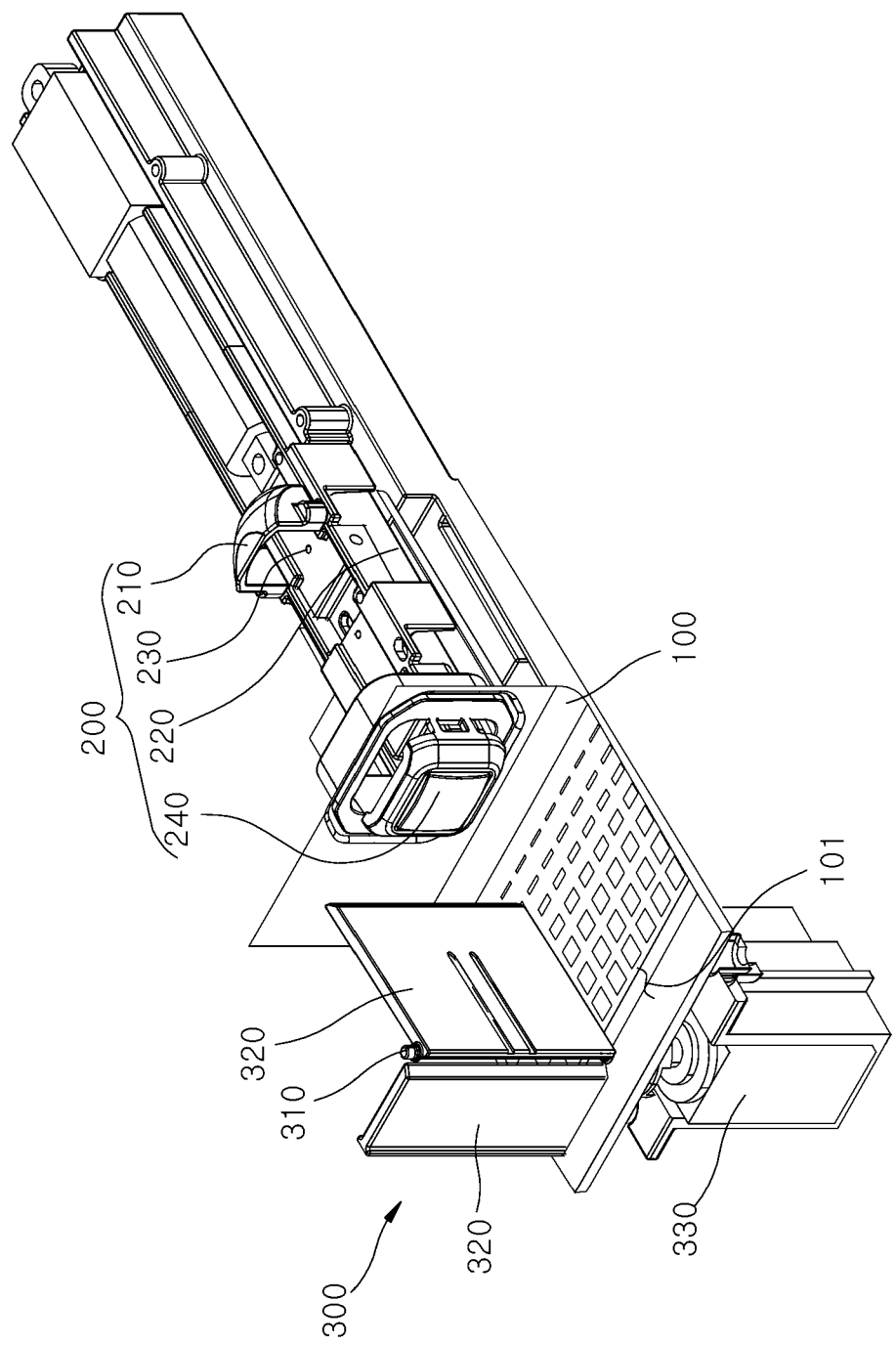

LIGHTING APPARATUS FOR VEHICLE AND CONTROL METHOD THEREOF

CROSS-REFERENCE TO RELATED APPLICATIONS

This application claims priority from and the benefit of Korean Patent Application No. 10-2021-0076149, filed on Jun. 11, 2021, which is hereby incorporated by reference for all purposes as if set forth herein.

BACKGROUND

1. Technical Field

Exemplary embodiments of the present disclosure relate to a lighting apparatus for a vehicle and a control method thereof, and more particularly, to a lighting apparatus for a vehicle, which can transfer a signal to a surrounding vehicle, driver or pedestrian, and a control method thereof.

2. Discussion of Related Art

In general, a vehicle includes various types of lighting apparatuses which allow a driver to easily check a target located around the vehicle during driving, and serve to inform a surrounding vehicle or pedestrian of the state of the vehicle or to transfer a signal to the surrounding vehicle or pedestrian.

However, the conventional lighting apparatuses transfer signals only by turning on/off LEDs, and thus have a limit to the types of signals that the lighting apparatuses can transfer. Furthermore, since the conventional lighting apparatuses can transfer only two-dimensional images, it is difficult for the lighting apparatuses to clearly transfer signals. Furthermore, when the lighting apparatuses transfer signals only by turning on/off LEDs in the daytime during which the illuminance outside the vehicle is high, the visibility is reduced.

The related art of the present disclosure is disclosed in Korean Patent No. 10-1789652 registered on Oct. 18, 2017 and entitled "LED Lamp of a Vehicle."

SUMMARY

Various embodiments are directed to a lighting apparatus for a vehicle, which can transfer a motion signal generated by a motion as well as a light emission signal generated by light, and a control method thereof.

In an embodiment, a lighting apparatus for a vehicle may include a housing installed at the front surface of a vehicle, and having an opening formed on one side thereof; a plurality of light emitting units installed in the housing, and configured to emit light toward the opening; and a plurality of flap units rotatably installed in the housing so as to open or close the opening, and disposed so as to face the light emitting units.

The plurality of light emitting units and the plurality of flap units may be arranged in two or more rows in the widthwise direction of the vehicle.

The plurality of light emitting units may be each configured to individually adjust the turn-on state thereof, and the plurality of flap units may be each configured to individually adjust the rotation state thereof.

The flap units may each include a flap member rotated on a rotating shaft extended across the housing in a top-to-bottom direction; and a driver connected to the rotating shaft, and configured to generate a driving force to adjust the rotation angle and the rotation direction of the flap member.

As the flap member is rotated at a preset angle to the inside of the housing while the front surface of the flap member is disposed in parallel to the widthwise direction of the vehicle, the opening may be opened.

The preset angle at which the flap member is rotated to the inside of the housing may be equal to or less than 90 degrees.

The front surface of the flap member may have a different color from the inside color of the housing or the surface color of the light emitting unit, such that color inversion occurs when the flap member is rotated.

The light emitting unit may be installed in the housing so as to move to the front or read of the vehicle.

The light emitting unit may include a light source turned on or off; a heat sink configured to support the light source, and discharge heat generated from the light source; a reflector configured to reflect light, emitted from the light source, to one side; and a lens configured to form a light distribution pattern by transmitting the light, reflected from the reflector, toward the opening.

The lighting apparatus may further include a display unit installed on the housing, and configured to display a preset color to the outside of the vehicle as the flap unit opens the opening.

The display unit may be formed by coating the inner surface of the housing with the preset color of paint.

The display unit may include a luminous or fluorescent material.

The lighting apparatus may further include a reflecting unit installed on the flap unit and configured to reflect the color displayed on the display unit to the outside of the vehicle when the flap unit opens the opening.

The lighting apparatus may further include: a sensing unit configured to sense the distance between the vehicle and a pedestrian or driver; and a control unit configured to receive the sensed information from the sensing unit, and transmit a light emitting unit turn-on signal for turning on the light emitting unit and a flap unit control signal for rotating the flap unit.

When the distance between the vehicle and the pedestrian falls within a first distance, the control unit may transmit the light emitting unit turn-on signal and the flap unit control signal to the light emitting unit and the flap unit, respectively, such that the light emitting unit and the flap unit indicate a walking direction to the pedestrian.

When the distance between the vehicle and the driver falls within a second distance, the control unit may transmit the light emitting unit turn-on signal and the flap unit control signal to the light emitting unit and the flap unit, respectively, such that the light emitting unit and the flap unit generate a welcome signal.

When the distance between the vehicle and the driver exceeds the second distance, the control unit may transmit the light emitting unit turn-on signal and the flap unit control signal to the light emitting unit and the flap unit, respectively, such that the light emitting unit and the flap unit generate a goodbye signal.

In an embodiment, a control method of a lighting apparatus for a vehicle may include: sensing, by a sensing unit, a distance between the vehicle and a pedestrian; determining, by a control unit, whether the distance between the vehicle and the pedestrian falls within a first distance; determining, by the control unit, a walking direction of the pedestrian when the distance between the vehicle and the pedestrian falls within the first distance; and indicating, by the control unit, the walking direction to the pedestrian by operating a plurality of flap units.

In the indicating of the walking direction, the plurality of flap units may open or close an opening while sequentially rotated in a direction parallel to the walking direction of the pedestrian.

As the flap units open or close the opening, color inversion may occur.

When the flap units open the opening, a display unit may display a preset color to an outside of the vehicle, and a reflecting unit may reflect the preset color, displayed by the display unit, toward the outside of the vehicle.

The control method may further include determining, by the control unit, whether the vehicle is traveling.

The control method may further include turning on/off, by the control unit, a light emitting unit on the basis of a preset illuminance value outside the vehicle.

In an embodiment, a control method of a lighting apparatus for a vehicle may include: sensing, by a sensing unit, a distance between the vehicle and a driver; determining, by a control unit, whether the distance between the vehicle and the driver falls within a second distance; generating, by the control unit, a welcome signal by operating a plurality of flap units and a plurality of light emitting units, when the distance between the vehicle and the driver falls within the second distance; and generating, by the control unit, a goodbye signal by operating the flap units and the light emitting units, when the distance between the vehicle and the driver exceeds the second distance.

The control method may further include determining, by the control unit, whether an ignition switch of the vehicle is turned on/off.

The generating of the welcome signal may include: a first welcome step in which the plurality of flap units open an opening while sequentially rotated from a center of the opening toward both ends of the opening, when the ignition switch of the vehicle is turned on; a second welcome step in which the plurality of light emitting units are turned on or off while the opening is opened; a third welcome step in which the plurality of flap units close the opening while sequentially rotated from both ends of the opening toward the center of the opening; and a fourth welcome step in which the plurality of flap units open the opening while rotated at the same time, and the plurality of light emitting units are turned on at the same time.

The second welcome step may include: turning on the plurality of light emitting units with a preset light intensity at the same time; sequentially turning on the plurality of light emitting units from the center of the opening toward both ends of the opening with a light intensity higher than the preset light intensity; sequentially turning off the plurality of light emitting units from both ends of the opening toward the center of the opening; and randomly flickering the plurality of light emitting units.

The generating of the welcome signal may further include turning off, by the control unit, the plurality of light emitting units at the same time when an illuminance value outside the vehicle exceeds a preset illuminance value after the fourth welcome step.

The generating of the welcome signal may further include flicking, by the control unit, a turn indicator a preset number of times before operating the flap units and the light emitting unit.

The generating of the goodbye signal may include: a first goodbye step of sequentially turning off the plurality of light emitting units from both ends of an opening toward the center of the opening, when the ignition switch of the vehicle is turned off; and a second goodbye step of closing, by the plurality of flap units, the opening while the plurality of flap units are sequentially rotated from both ends of the opening toward the center of the opening.

The generating of the goodbye signal may further include flicking, by the control unit, a turn indicator a preset number of times before operating the flap units and the light emitting unit.

As the flap units open or close an opening, color inversion may occur.

When the flap units open an opening, a display unit may display a preset color to an outside of the vehicle, and a reflecting unit may reflect the preset color, displayed by the display unit, to the outside of the vehicle.

In accordance with the embodiment of the present disclosure, the lighting apparatus for a vehicle may transmit various types of signals to a surrounding vehicle, driver or pedestrian by combining a light emission signal generate by the light emitting units and a motion signal generated by the flap units, and strengthen the visibility in a daytime situation.

Furthermore, the lighting apparatus may implement a dynamic image by individually adjusting the turn-on states of the plurality of light emitting units and the rotation states of the plurality of flap units, thereby transmitting a more efficient and intuitive signal.

Furthermore, in the lighting apparatus, the flap units may be disposed so as to interfere with light emitted from the light emitting units. Therefore, the flap units may apply a shadow effect to a light emission signal, thereby improving the aesthetic sensibility of the light emission signal.

Furthermore, when the opening is opened, the display unit may display a preset color to the outside of the vehicle, which makes it possible to transfer a clearer signal to a surrounding vehicle, driver or pedestrian.

Furthermore, the reflecting unit may reflect the preset color displayed on the display unit, which makes it possible to secure the visibility while displaying a high quality image.

The control method of the lighting apparatus for a vehicle in accordance with the embodiment of the present disclosure may indicate a walking direction by operating the flap units and the lighting units on the basis of the distance between the vehicle and a pedestrian and the walking direction of the pedestrian, thereby transferring a clearer signal, and preventing a safety accident caused by a disagreement in communication with the pedestrian.

The control method of the lighting apparatus for a vehicle in accordance with the embodiment of the present disclosure may generate a welcome signal and a goodbye signal by operating the flap units and the light emitting units on the basis of the distance between the vehicle and a driver, which makes it possible for the driver to more easily recognize the location of the vehicle, and to check the state of the vehicle such as a start-up of the vehicle from a remote location.

BRIEF DESCRIPTION OF THE DRAWINGS

FIG. 5 is an expanded perspective view schematically illustrating the configuration of the lighting apparatus for a vehicle in accordance with the embodiment of the present disclosure.

DETAILED DESCRIPTION

Figure 1:
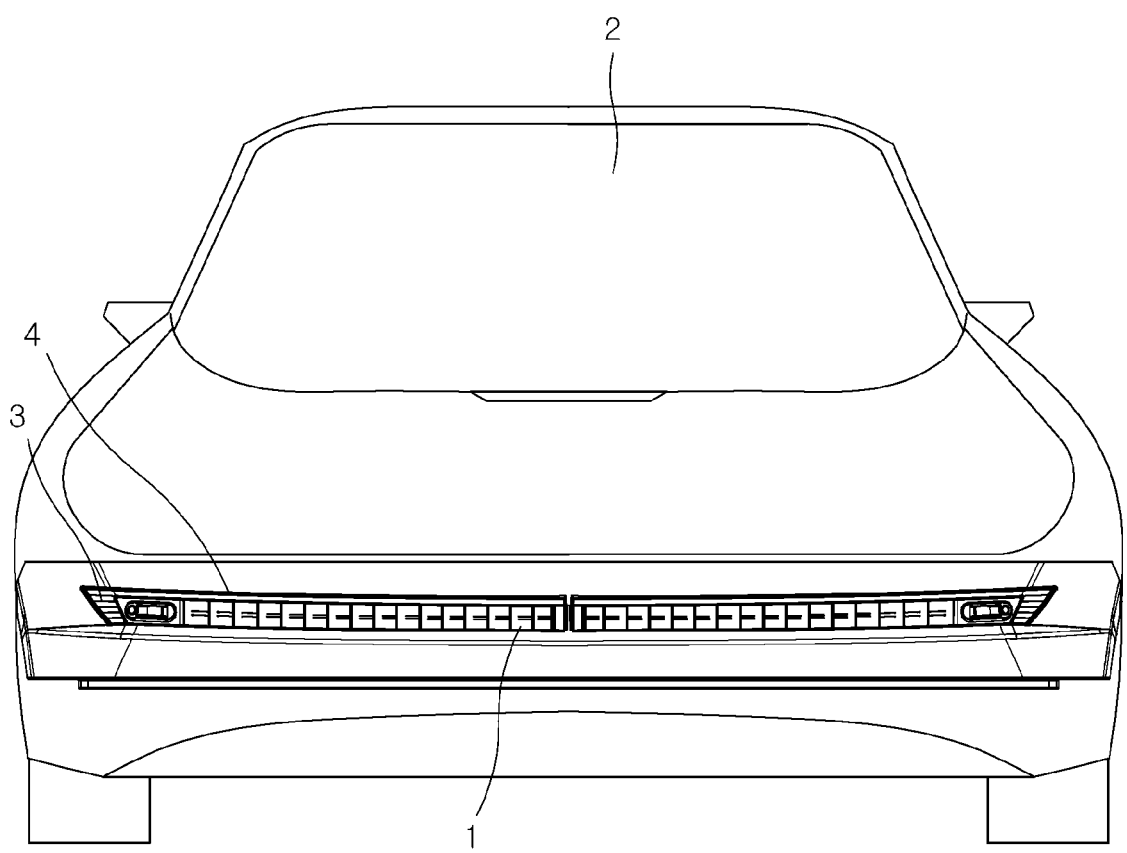
FIGS. 1 and 2 are diagrams schematically illustrating that a lighting apparatus for a vehicle in accordance with an embodiment of the present disclosure is installed.

Hereinafter, a lighting apparatus for a vehicle and a control method thereof will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Throughout the specification, when one element is referred to as being "connected to" or "coupled to" another element, it may indicate that the one element is "directly connected or coupled to" another element or the one element is "indirectly connected or coupled to" with still another element interposed therebetween. In this specification, when an element "includes or has" a component, it may indicate that the element does not exclude another component, but can further include or have another component, unless referred to the contrary.

Through this specification, like reference numerals may represent the same components. Although like or similar reference numbers are not mentioned or described in a specific drawing, the reference numerals may be described with reference to other drawings. Furthermore, although a component is not represented by a reference numeral in a specific drawing, the component may be described with reference to other drawings. Furthermore, the number, shape and size of sub-components included in the drawings of this specification and the relative difference between sizes are set for convenience of description, and may not limit embodiments but may be set to various values.

Figure 2:
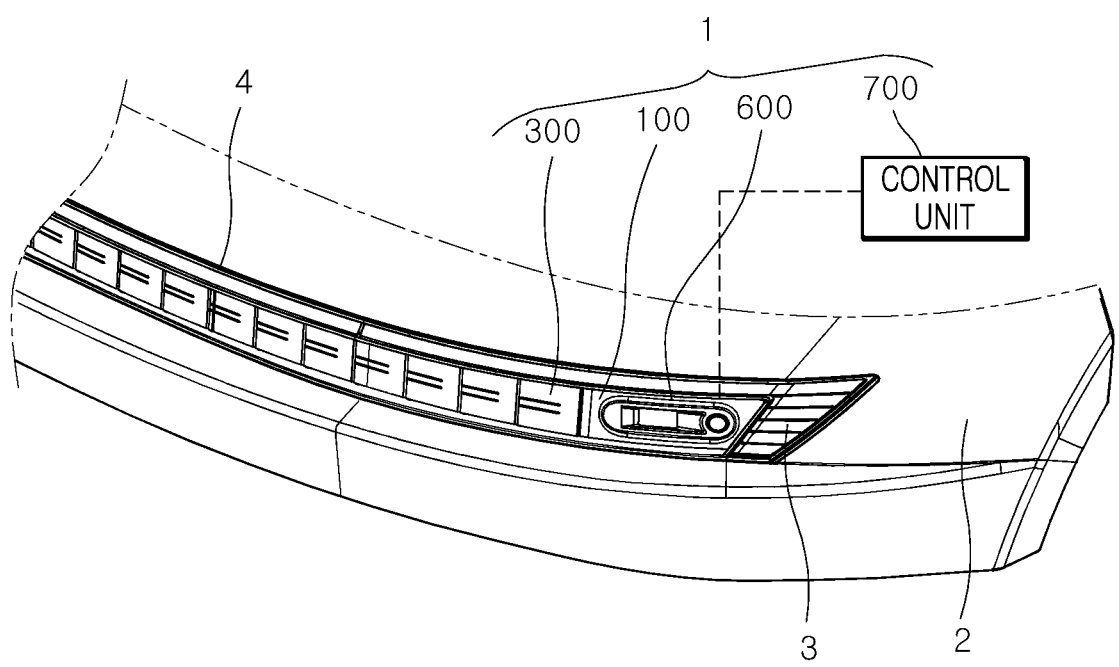
Figure 3:
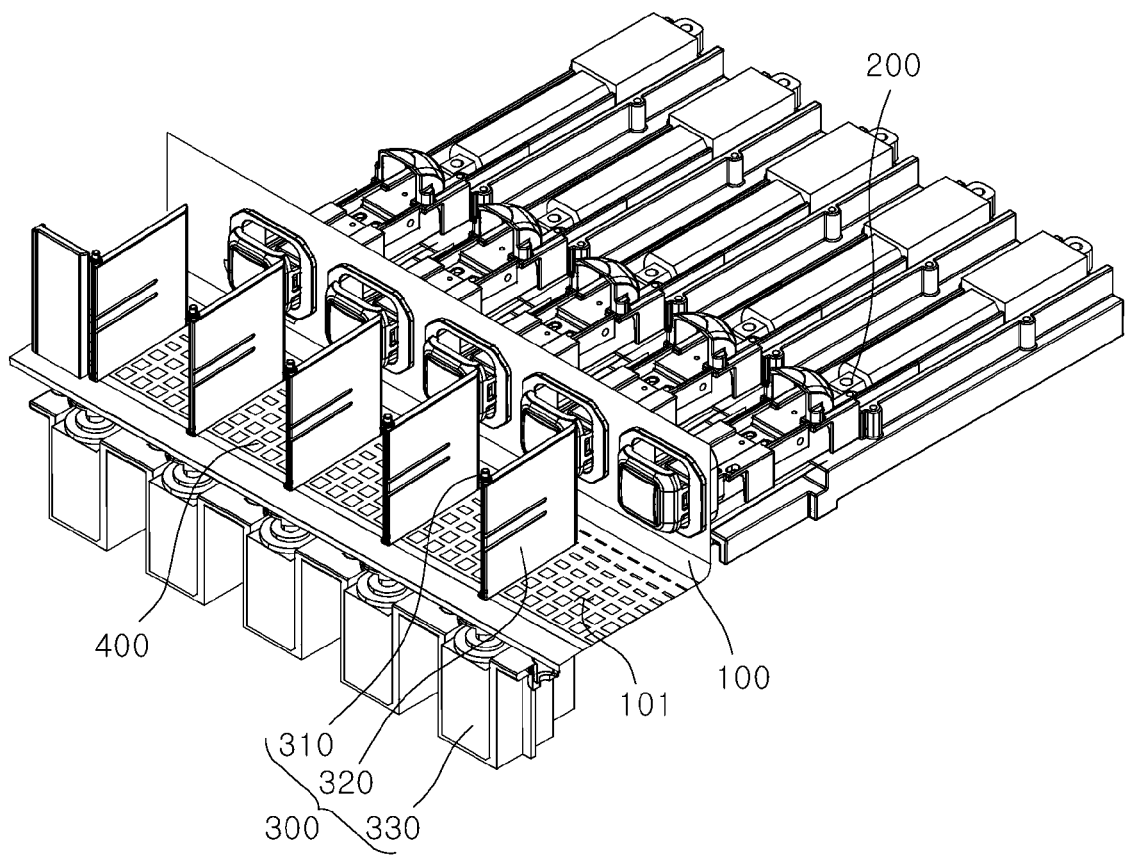
FIG. 3 is a perspective view schematically illustrating the configuration of the lighting apparatus for a vehicle in accordance with the embodiment of the present disclosure.
Figure 4A:
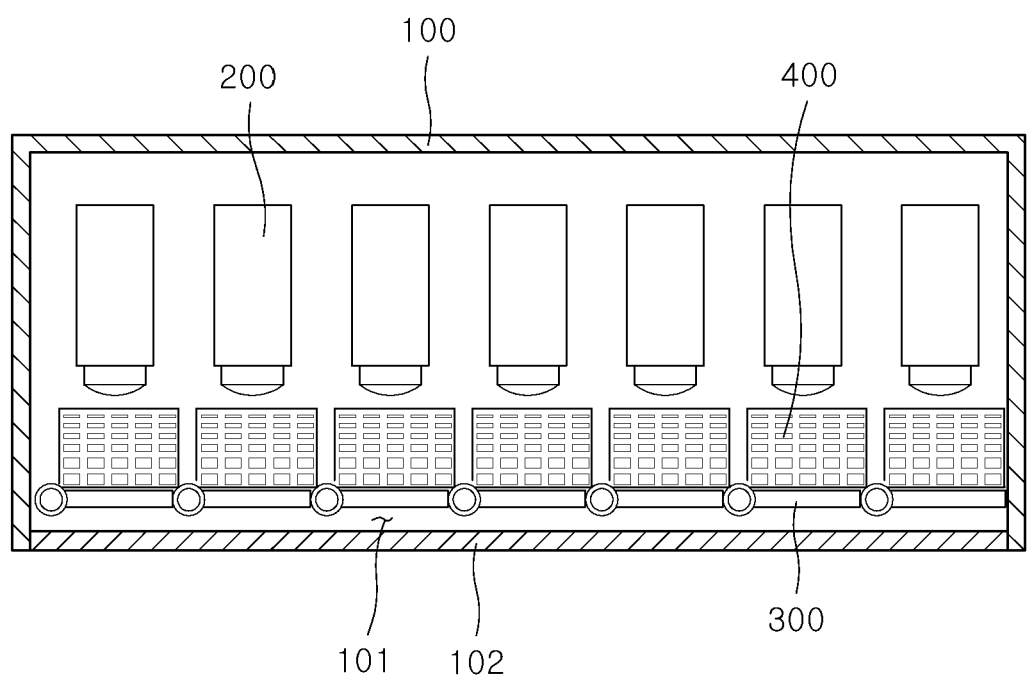
FIGS. 4A and 4B are plan views schematically illustrating the configuration of the lighting apparatus for a vehicle in accordance with the embodiment of the present disclosure.
Figure 4B:
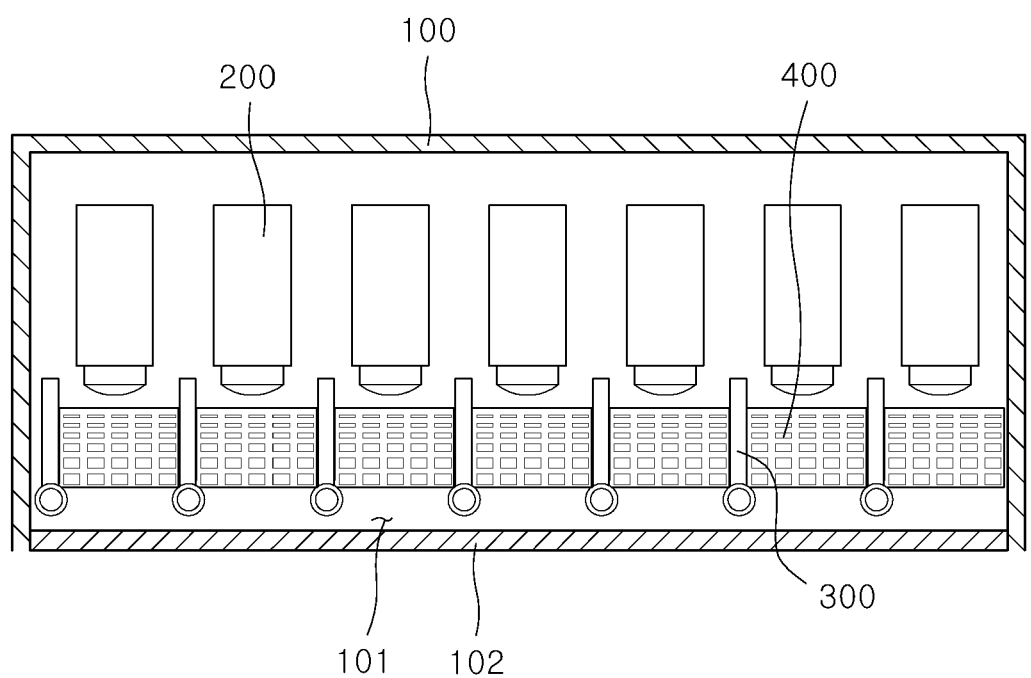

FIGS. 1 and 2 are diagrams schematically illustrating that a lighting apparatus for a vehicle in accordance with an embodiment of the present disclosure is installed, FIG. 3 is a perspective view schematically illustrating the configuration of the lighting apparatus for a vehicle in accordance with the embodiment of the present disclosure, FIGS. 4A and 4B are plan views schematically illustrating the configuration of the lighting apparatus for a vehicle in accordance with the embodiment of the present disclosure, and FIG. 5 is an expanded perspective view schematically illustrating the configuration of the lighting apparatus for a vehicle in accordance with the embodiment of the present disclosure.

Referring to FIGS. 1 to 5, a lighting apparatus 1 for a vehicle in accordance with an embodiment of the present disclosure includes a housing 100, a light emitting unit 200, a flap system including a plurality of flip units 300, a display unit 400, a reflecting unit 500, a sensing unit 600, and a control unit 700.

The housing 100 is installed inside the front surface of a vehicle 2, and serves to support the light emitting unit 200 and the flap unit 300 which will be described below. The housing 100 in accordance with the embodiment of the present disclosure is formed in a hollow box shape, and installed inside a bumper installed at the front surface of the vehicle 2. The specific shape of the housing 100 is not limited to that illustrated in FIGS. 1 to 5, and may be variously changed in design as long as the housing 100 can be installed inside the front surface of the vehicle 2, and support the light emitting unit 200 and the flap unit 300 which will be described below.

The housing 100 has an opening 101 formed on one side thereof. The opening 101 in accordance with the embodiment of the present disclosure is formed in the shape of a through-hole disposed at the front of the housing 100, and communicates the inside of the housing 100 with the outside of the front surface of the vehicle 2. The opening 101 has a cross-section corresponding to the cross-sectional shape of the front surface of the housing 100. The opening 101 is extended across the housing 100 in the widthwise direction of the housing 100, i.e., the side-to-side direction of the vehicle 2.

The opening 101 may have a blocking part 102 installed at the front thereof, the blocking part 102 serving to prevent foreign matters such as dust and water from flowing into the housing 100. The blocking part 102 in accordance with the embodiment of the present disclosure is formed in the shape of a plate, and disposed so as to face the opening 101. The blocking part 102 may include a transparent material such as polycarbonate (PC) such that light emitted from the light emitting unit 200 to be described below can be transmitted to the outside of the vehicle.

A pair of turn indicators 3 are installed on both sides of the top of the housing 100, and serve to inform a surrounding vehicle or pedestrian of the turning direction of the vehicle, while flickering in a preset period according to a driver's manipulation.

Between the pair of turn indicators 3, a daytime running light 4 is installed, which is turned on separately from the light emitting unit 200 to be described below such that a surrounding vehicle or pedestrian can easily recognize the vehicle 2 during daytime operation.

The light emitting unit 200 is installed inside the rear of the housing 100, and emits light toward the opening 101. The light emitting unit 200 may be installed in the housing 100 so as to be movable to the front or rear of the vehicle 2. Thus, the light emitting unit 200 may adjust a light distribution angle of the light emitted to the outside of the vehicle 2 through the opening 101. The light emitting unit 200 may be provided as a plurality of light emitting units which are arranged in two or more rows in the widthwise direction of the vehicle 2 and the housing 100. The plurality of light emitting units 200 may be each configured to individually adjust the turn-on state thereof. Thus, the plurality of light emitting units 200 may be sequentially or randomly turned on to transfer light emission signals to a surrounding vehicle, driver or pedestrian.

The light emitting unit 200 in accordance with the embodiment of the present disclosure includes a light source 210, a heat sink 220, a reflector 230, and a lens 240.

The light source 210 is installed on the heat sink 220 which will be described below, and can be turned on/off by power received from the outside. The light source 210 in accordance with the embodiment of the present disclosure may include one or more LEDs which are turned on/off by power received from the outside.

The heat sink 220 supports the light source 210, and discharges heat, generated from the light source 210, to the outside of the housing 100. The heat sink 220 in accordance with the embodiment of the present disclosure is installed on the opposite side of the opening 101 inside the housing 100, i.e., at the rear of the housing 100. The light source 210 may be installed on the top surface of the heat sink 220. The heat sink 220 includes a plurality of heat radiation pins (not illustrated), and receives heat, generated by the turned-on light source 210, through thermal conduction. The heat sink 220 discharges heat, transferred to the plurality of heat radiation pins, to the outside of the housing 100 through the convective process with the outside of the housing 100.

The reflector 230 is disposed so as to face the light source 210, and serves to reflect light, emitted from the light source 210, to one side. The reflector 230 in accordance with the embodiment of the present disclosure is formed in a spherical shape with a predetermined curvature, and has an inner surface facing the light source 210. The inner surface of the reflector 230 may include a high reflective material so as to reflect light emitted from the light source 210. The reflector 230 has an open front side, and reflects light, emitted from the light source 210, to the front of the housing 100.

The lens 240 forms a light distribution pattern by transmitting the light, reflected from the reflector 230, toward the opening 101. The lens 240 in accordance with the embodiment of the present disclosure is disposed on a reflection path of light reflected from the reflector 230. The lens 240 is disposed between the opening 101 and the reflector 230, and spaced apart by a predetermined distance from the reflector 230 toward the front of the housing 100. The lens 240 may include a transparent material such as glass or plastic to transmit light reflected from the reflector 230. The lens 240 forms a light distribution pattern such as a low beam or high beam to the front of the vehicle 2 by transmitting light reflected from the reflector 230 to the opening 101. The specific shape of the lens 240 may be changed in design to the shapes of various types of lenses such as an aspherical lens, depending on a light emitting range, the light distribution pattern or the like.

The flap unit 300 is rotatably installed in the housing 100 so as to open or close the opening 101. The flap unit 300 transfers a signal, formed by a motion thereof, to a surrounding vehicle, driver or pedestrian, while opening or closing the opening 101. Thus, the flap unit 300 can secure visibility even in a daytime situation in which light emitted through the light emitting unit 200 is hardly recognized. When opening or closing the opening 101, the flap unit 300 is disposed so as to face the light emitting unit 200, and thus interferes with light emitted from the light emitting unit 200. Therefore, the flap unit 300 may transfer more various types of signals with the light emitting unit 200, and vary the amount of light emitted from the light emitting unit 200, thereby further strengthening the visibility of the surrounding vehicle, driver or pedestrian. The flap unit 300 may be provided as a plurality of flap units which are arranged in two or more rows in the widthwise direction of the vehicle 2 and the housing 100. The plurality of flap units 300 may be each configured to individually adjust the rotation state thereof. Thus, the plurality of flap units 300 may transfer a predetermined direction signal to a pedestrian while being sequentially rotated. Furthermore, the flap units 300 may apply a shadow effect to light emitted from the light emitting unit 200 while being maintained at different rotation angles, thereby improving the visibility and aesthetic sensibility of the light emitted from the light emitting unit 200.

The flap unit 300 in accordance with the embodiment of the present disclosure includes a rotating shaft 310, a flap member 320, and a driver 330.

The rotating shaft 310 is rotatably installed in the housing 100, and serves to rotate the flap member 320 which will be described below. The rotating shaft 310 in accordance with the embodiment of the present disclosure is formed in the shape of a rotating shaft which is vertically extended across the housing 100 in the top-to-bottom direction. The rotating shaft 310 is disposed at the front of the housing 100 or more specifically between the opening 101 and the lens 240. The rotating shaft 310 is disposed at a position spaced apart by a predetermined distance from one end (left end in FIG. 5) of the lens 240. The rotating shaft 310 has a lower end connected to the driver 330, which will be described below, through the bottom surface of the housing 100.

The flap member 320 is rotated on the rotating shaft 310 when the rotating shaft 310 is rotated. The flap member 320 in accordance with the embodiment of the present disclosure is formed in the shape of a plate having a rectangular cross-section, and has one end (left end in FIG. 5) connected to the outer circumferential surface of the rotating shaft 310. When the opening 101 is closed, the front surface of the flap member 320 is disposed in parallel to the widthwise direction of the vehicle 2. The flap member 320 has a larger width than the lens 240, and thus can completely block light emitted from the lens 240 when the opening 101 is closed. The flap member 320 is rotated at a preset angle toward the inside of the housing 100, and thus opens the opening 101.

The preset angle at which the flap member 320 is rotated to the inside of the housing 100 may be equal to or less than 90 degrees. The front surface of the flap member 320 may have a different color from the inside color of the housing 100, the surface color of the light emitting unit 200, or the color of light emitted from the light emitting unit 200, such that color inversion occurs when the flap member 320 is rotated. Thus, the flap member 320 may more effectively inform a surrounding vehicle, driver or pedestrian that the opening 101 is being opened/closed. When the opening 101 is closed, a plurality of flap members 320 abut on the rotating shaft 310 to which the neighboring flap member 320 is connected. Therefore, when the opening 101 is closed, the flap member 320 may block lights, emitted from the plurality of light emitting units 200, from leaking to the outside.

The driver 330 is connected to the rotating shaft 310, and generates a driving force to adjust the rotation angle and the rotation direction of the flap member 320. The driver 330 in accordance with the embodiment of the present disclosure may be configured as an electric motor which receives power from the outside and generates a rotational force. The driver 330 is fixed to the outer bottom surface of the housing 100, and has an output shaft connected to the bottom of the rotating shaft 310. Between the driver 330 and the rotating shaft 310, a reduction gear may be installed.

The display unit 400 is installed in the housing 100 so as to display a preset color to the outside of the vehicle 2 as the flap unit 300 opens the opening 101. The display unit 400 in accordance with the embodiment of the present disclosure is disposed on the inner bottom surface of the housing 100, facing the rotation path of the lower end portion of the flap member 320. The display unit 400 is formed by coating the bottom surface of the housing 100 with a preset color. More specifically, the display unit 400 may be formed by applying a preset color of paint onto a bezel recessed into the bottom surface of the housing 100 or attaching a preset color of film onto the bezel. The display unit 400 may be formed by applying a preset color of paint onto the bottom surface of the housing 100 through a high glossy method, such that the preset color of paint exhibits a gloss. The display unit 400 may include a luminous or fluorescent material which absorbs light from the outside and discharges a longer wavelength of light than the wavelength of the absorbed light, such that the preset color can be displayed even in the nighttime. The preset color may be changed in design to various colors, as long as the color can be recognized from the outside of the vehicle 2 by a surrounding vehicle or pedestrian. The shape of the display unit 400 is not limited to that illustrated in FIG. 5, but can be variously changed in design as long as the display unit 400 can display the preset color.

The reflecting unit 500 is installed on the flap unit 300 so as to reflect the color displayed on the display unit 400 to the outside of the vehicle 2, when the flap unit 300 opens the opening 101.

Figure 6:
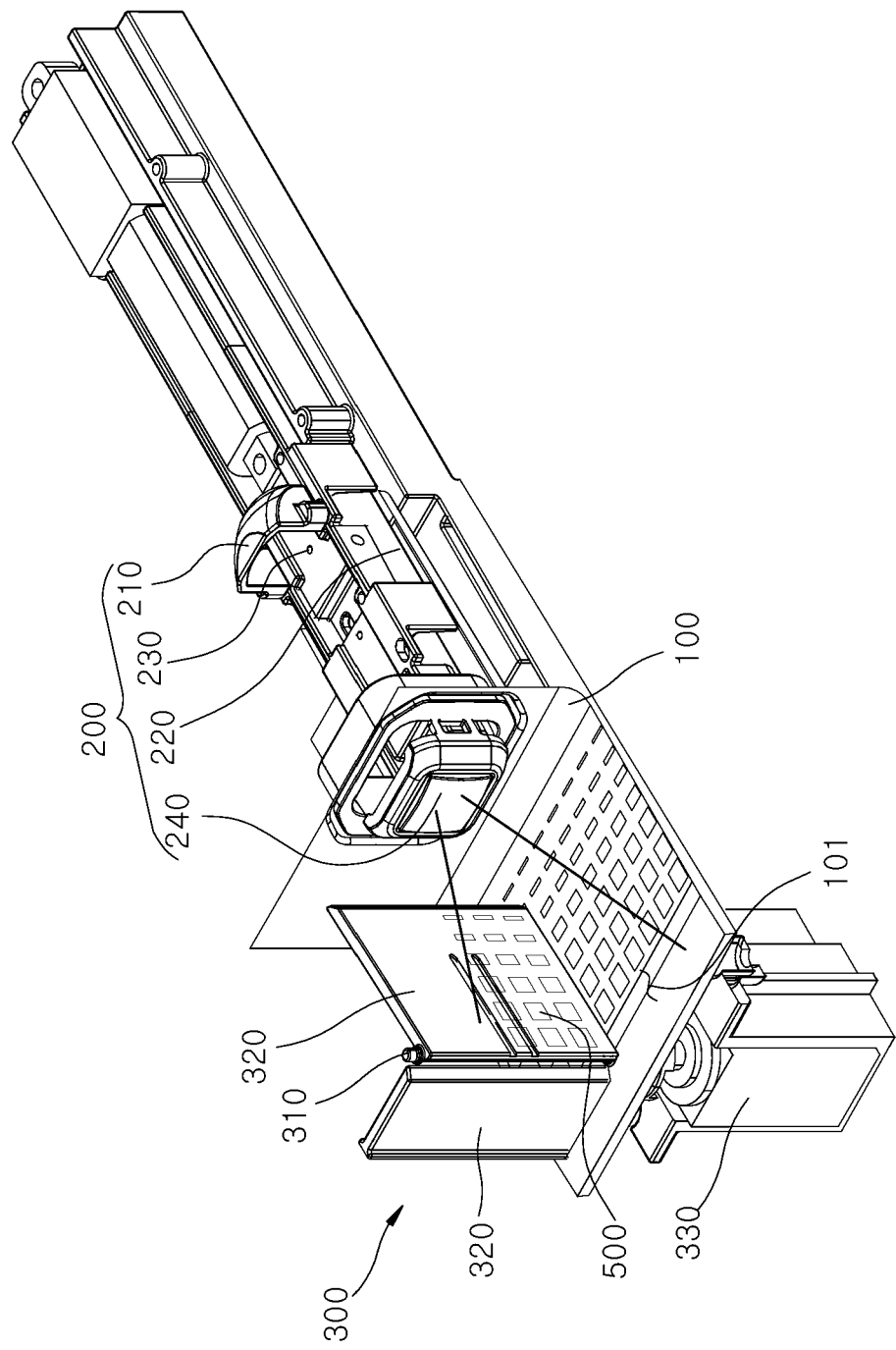
FIG. 6 is a perspective view schematically illustrating the configuration of a reflecting unit in accordance with the embodiment of the present disclosure.

FIG. 6 is a perspective view schematically illustrating the configuration of the reflecting unit in accordance with the embodiment of the present disclosure.

Referring to FIG. 6, the reflecting unit 500 in accordance with the embodiment of the present disclosure is disposed on the front surface of the flap member 320 which vertically faces the display unit 400 when the opening 101 is opened. The reflecting unit 500 may be made of a high reflective material and formed as one body with the front surface of the flap member 320, or formed by coating the front surface of the flap member 320 with a high reflective material.

Figure 7:
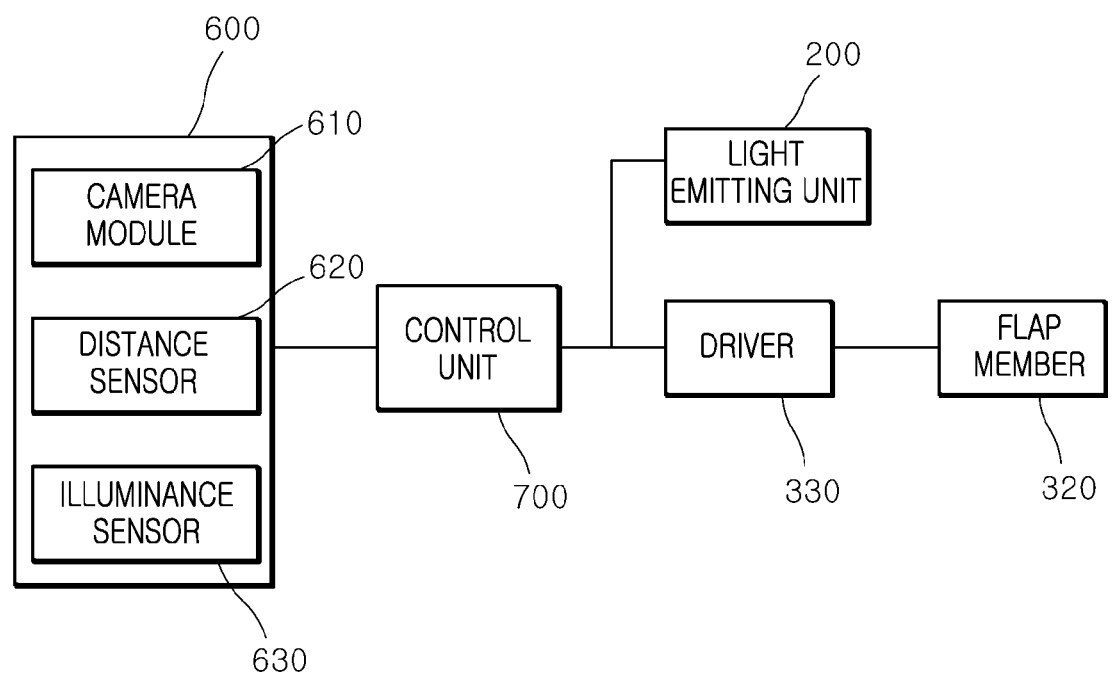
FIG. 7 is a diagram schematically illustrating the configurations of a sensing unit and a control unit in accordance with the embodiment of the present disclosure.

FIG. 7 is a diagram schematically illustrating the configurations of the sensing unit and the control unit in accordance with the embodiment of the present disclosure.

The sensing unit 600 is configured to sense the state around the vehicle, and sense the distance between the vehicle and a pedestrian or between the vehicle and a driver. The sensing unit 600 in accordance with the embodiment of the present disclosure may include a camera module 610, a distance sensor 620, and an illuminance sensor 630.

The camera module 610 is installed on the front surface of the vehicle 2 or either side of the housing 100, and serves to acquire image data on a pedestrian or driver ahead of the vehicle 2 by capturing an image of the forward area of the vehicle 2.

The distance sensor 620 senses the distance between the vehicle 2 and a pedestrian or driver. The distance sensor 620 may include one or more of various types of sensors such as a lidar sensor, a laser sensor and an ultrasonic wave sensor, which can measure a distance, and sense the distance between the vehicle 2 and a pedestrian or driver.

The distance sensor 620 may sense the distance between the vehicle 2 and the driver through a portable terminal carried by the driver. The portable terminal may be exemplified as a smart key for a vehicle. More specifically, the distance sensor 620 may include a GPS (Global Positioning System), and sense the relative bearing and relative distance of the driver's portable terminal with respect to the vehicle 2. Furthermore, when an RKE (Remote Keyless Entry) or PKE (Passive Keyless Entry) signal for wirelessly opening or closing the door of the vehicle from a remote location is received from the portable terminal of the driver, the distance sensor 620 may sense that the driver has approached the vehicle 2 within a predetermined distance.

The illuminance sensor 630 is installed in the vehicle 2, and serves to sense the brightness (illuminance) value around the vehicle 2.

The control unit 700 receives the sensed information from the sensing unit 600, and transmits a light emitting unit turn-on signal for turning on the light emitting unit 200 and a flap unit control signal for rotating the flap unit 300. More specifically, when the distance between the vehicle 2 and a pedestrian is less than a first distance, the control unit 700 transmits the light emitting unit turn-on signal and the flap unit control signal to the light emitting unit 200 and the flap unit 300, respectively, such that the light emitting unit 200 and the flap unit 300 indicate a walking direction to the pedestrian. When the distance between the vehicle 2 and a driver is less than a second distance, the control unit 700 transmits the light emitting unit turn-on signal and the flap unit control signal to the light emitting unit 200 and the flap unit 300, respectively, such that the light emitting unit 200 and the flap unit 300 generate a welcome signal. When the distance between the vehicle 2 and the driver exceeds the second distance, the control unit 700 transmits the light emitting unit turn-on signal and the flap unit control signal to the light emitting unit 200 and the flap unit 300, respectively, such that the light emitting unit 200 and the flap unit 300 generate a goodbye signal. The first distance and the second distance may be changed in design to various values within the range of separation distances from the vehicle 2. The control unit 700 in accordance with the embodiment of the present disclosure may be exemplified as a microprocessor or ECU (Electronic Control Unit) which is connected to the light emitting unit 200 and the driver 330, and receives the sensed information from the sensing unit 600, and transmits the light emitting unit turn-on signal and the flap unit control signal to the light emitting unit 200 and the flap unit 300, respectively.

Hereafter, a control method of a lighting apparatus for a vehicle in accordance with an embodiment of the present disclosure will be described.

Figure 8:
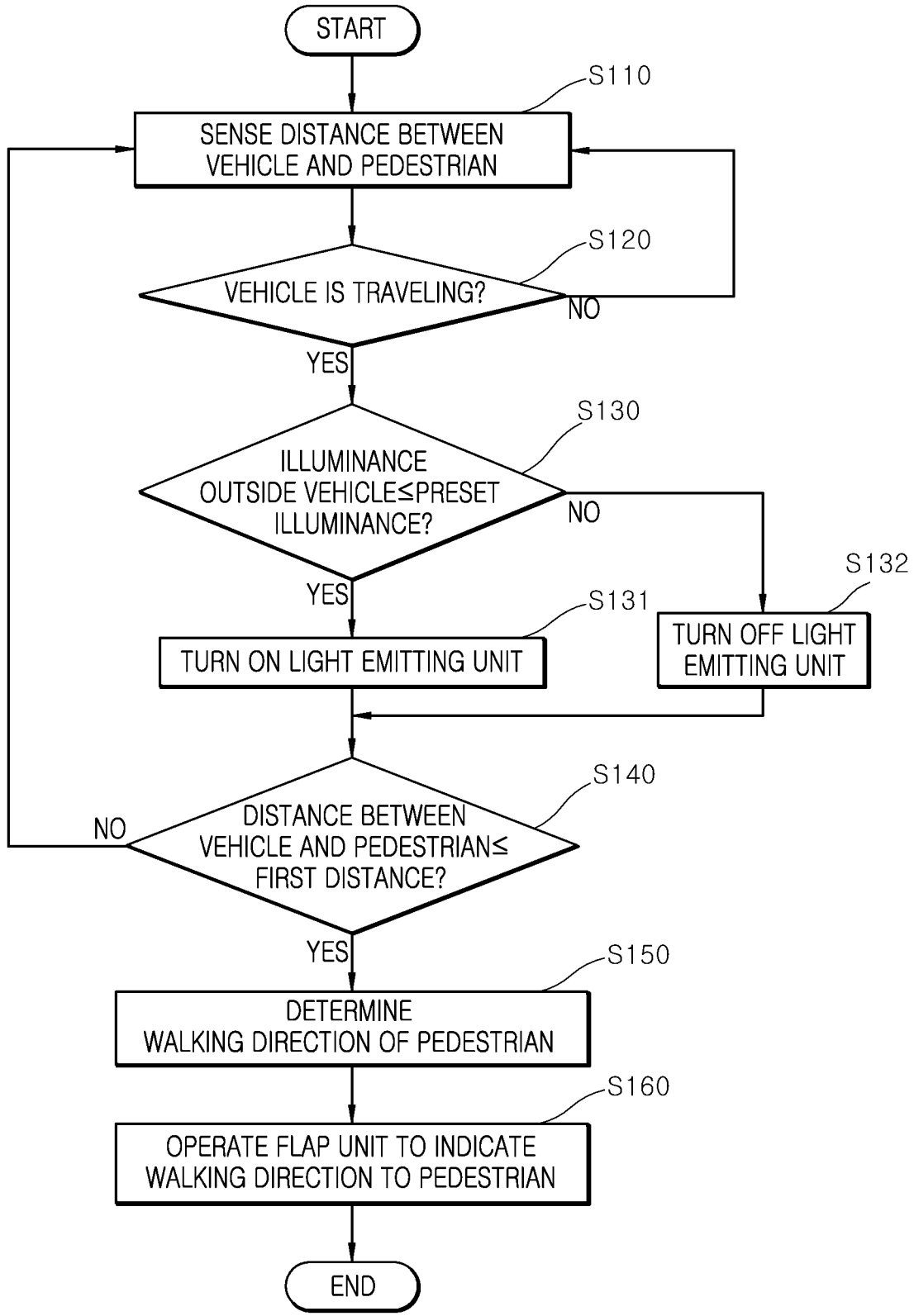
FIG. 8 is a flowchart schematically illustrating a control method of a lighting apparatus for a vehicle in accordance with an embodiment of the present disclosure.

FIG. 8 shows that the control method is divided into a plurality of steps. However, the order of at least some steps may be changed, at least some steps may be each combined with another step, or omitted or divided into sub steps, or one or more steps (not illustrated) may be added.

Figure 9:
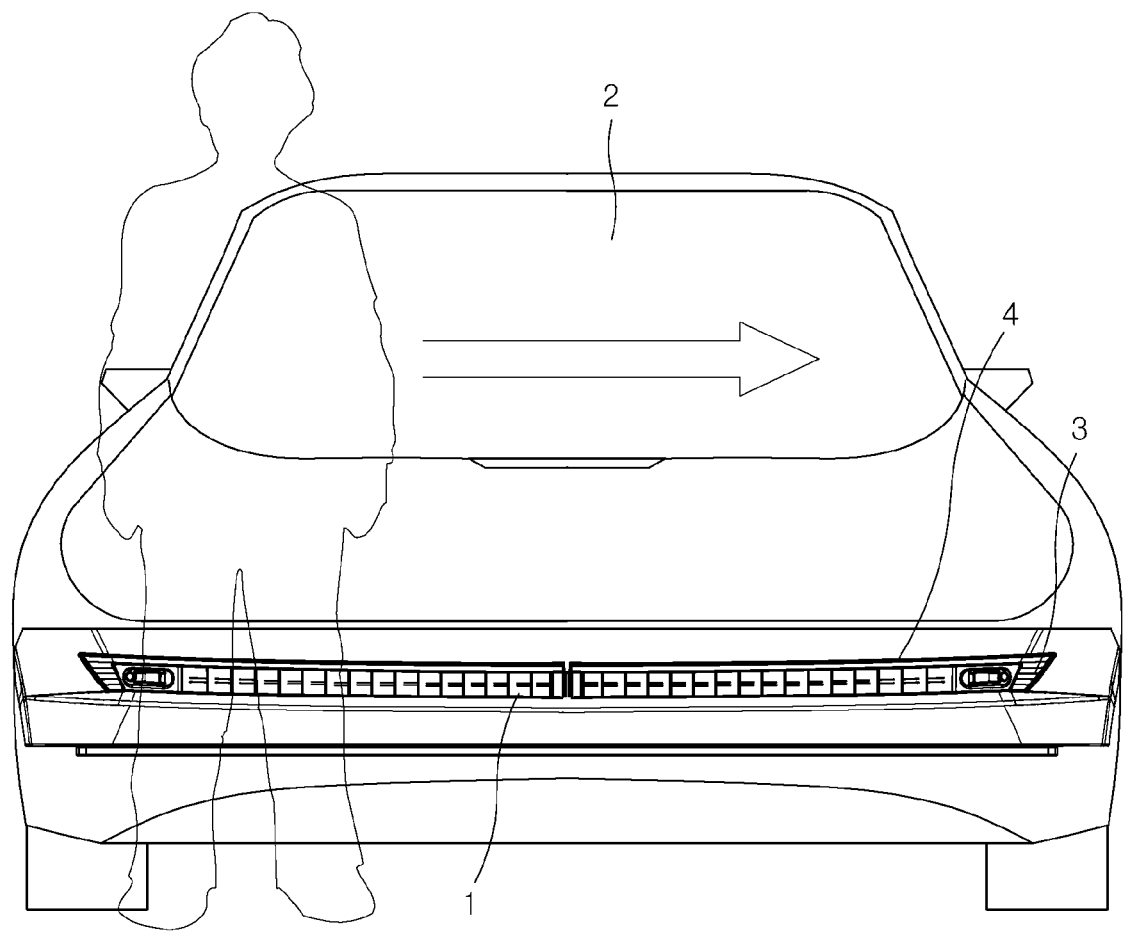
FIGS. 9, 10A and 10B are operation diagrams schematically illustrating an operation process of the control method of a lighting apparatus for a vehicle in accordance with the embodiment of the present disclosure.
Figure 10A:
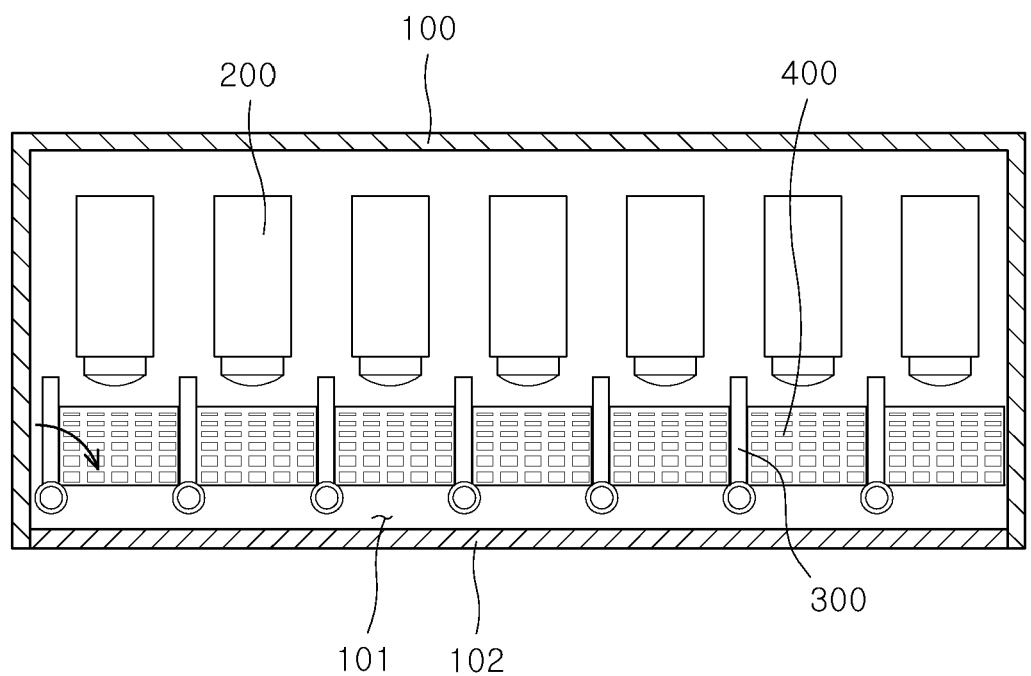
Figure 10B:
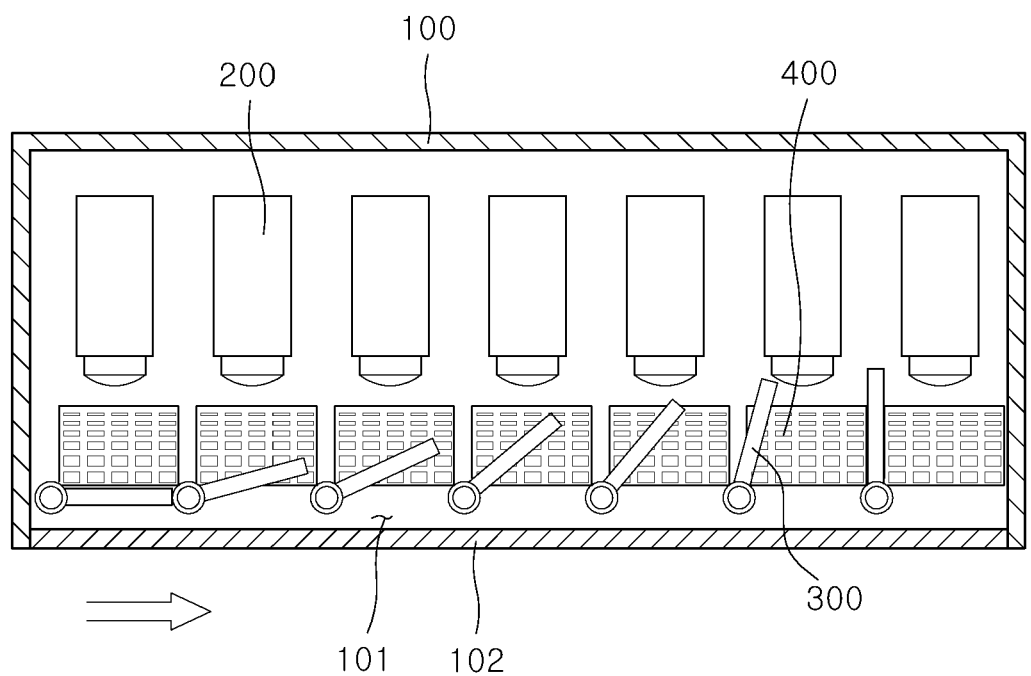

FIG. 8 is a flowchart schematically illustrating a control method of a lighting apparatus for a vehicle in accordance with an embodiment of the present disclosure, and FIGS. 9, 10A and 10B are operation diagrams schematically illustrating an operation process of the control method of a lighting apparatus for a vehicle in accordance with the embodiment of the present disclosure.

Referring to FIG. 8, the sensing unit 600 senses the distance between the vehicle 2 and a pedestrian in step S110. More specifically, the sensing unit 600 recognizes a pedestrian ahead of the vehicle 2 through the camera module 610, and measures the distance from the vehicle 2 to the pedestrian through the distance sensor 620.

The control unit 700 determines whether the vehicle 2 is traveling, in step S120. More specifically, the control unit 700 determines whether the vehicle 2 is traveling, on the basis of whether the ignition switch of the vehicle 2 is turned on/off, a gear operating state of the vehicle 2, and whether an autonomous driving mode is turned on/off.

The control unit 700 turns on or off the light emitting unit 200 on the basis of a preset illuminance value outside the vehicle 2, in step S130. More specifically, when the illuminance value outside the vehicle, measured by the illuminance sensor 630, is equal to or less than the preset illuminance value, the control unit 700 transmits the light emitting unit turn-on signal to the light emitting unit 200 in order to turn on the light emitting unit 200, in step S131. Simultaneously, the control unit 700 opens the opening 101 by rotating the flap unit 300. When the illuminance value outside the vehicle, measured by the illuminance sensor 630, exceeds the preset illuminance value, the control unit 700 stops transmitting the light emitting unit turn-on signal to the light emitting unit 200, and thus turns off the light emitting unit 200, in step S132. In this case, the operation of turning off the light emitting unit 200 may indicate an operation of not only turning off the turned-on light emitting unit 200, but also maintaining the turned-off light emitting unit 200. The preset illuminance value may be changed in design to various values in consideration of a driver's visibility.

As illustrated in FIG. 8, steps S120 and S130 may be sequentially performed after step S110. On the other hand, steps S120 and 130 may be performed at the same time as step S110, or in a different order from step S110.

When it is determined in step S120 that the vehicle 2 is traveling, the control unit 700 determines whether the distance between the vehicle 2 and the pedestrian, sensed in step S110, is less than the first distance, in step S140.

When it is determined in step S140 that the distance between the vehicle 2 and the pedestrian is less than the first distance, the control unit 700 determines the walking direction of the pedestrian in step S150.

After determining the walking direction of the pedestrian in step S150, the control unit 700 operates the flap unit 300 to indicate the walking direction to the pedestrian, in step S160. More specifically, the control unit 700 transmits the flap unit control signal to the flap unit 300 to sequentially rotate the flap units 300 in a direction parallel to the walking direction of the pedestrian. The plurality of flap units 300 indicate the walking direction to the pedestrian while opening or closing the opening 101 in the direction parallel to the walking direction of the pedestrian.

For example, when determining that the pedestrian walks from left to right, the control unit 700 sequentially operates a plurality of drivers 330 from the driver 330 disposed at the leftmost position to the driver 330 disposed at the rightmost position, as illustrated in FIGS. 10A and 10B. In connection with this operation, the plurality of flap members 320 are sequentially rotated from the flap member 320 disposed at the leftmost position to the flap member 320 disposed at the rightmost position. When the plurality of flap members 320 are rotated while the opening 101 is opened, the flap members 320 transfer a walking signal for instructing the pedestrian to walk from left to right, while sequentially closing the opening 101 from left to right.

When the flap unit 300 opens or closes the opening 101, color inversion occurs because the front surface of the flap member 320 has a different color from the inside color of the housing 100, the surface color of the light emitting unit 200, or the color of light emitted from the light emitting unit 200.

Furthermore, when the flap unit 300 opens the opening 101, the display unit 400 displays a preset color to the outside of the vehicle 2, and the reflecting unit 500 reflects the preset color, displayed by the display unit 400, toward the outside of the vehicle 2.

Hereafter, a control method of a lighting apparatus for a vehicle in accordance with another embodiment of the present disclosure will be described.

Figure 11:
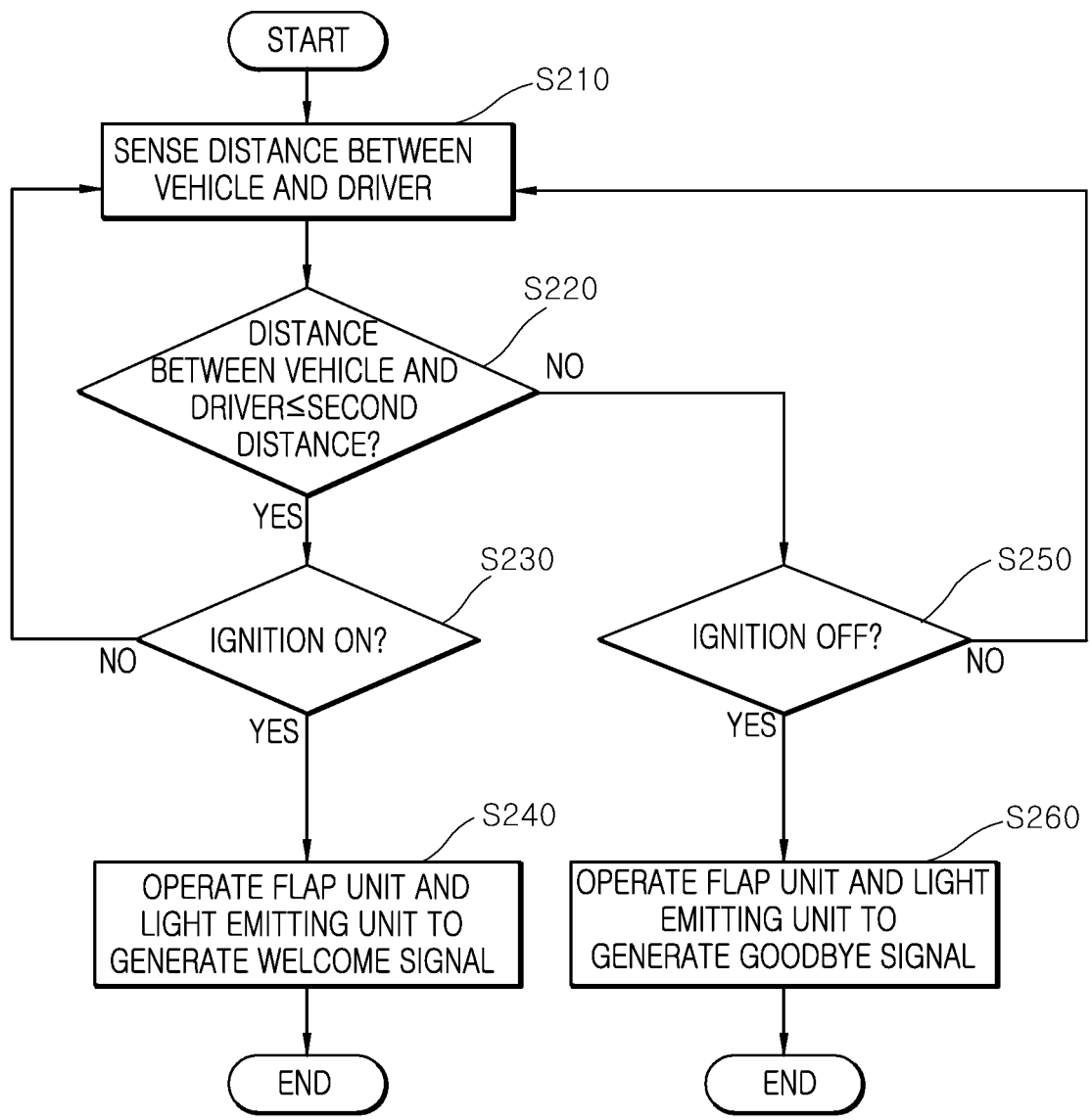
FIG. 11 is a flowchart schematically illustrating a control method of a lighting apparatus for a vehicle in accordance with another embodiment of the present disclosure.

FIG. 11 is a flowchart schematically illustrating a control method of a lighting apparatus for a vehicle in accordance with another embodiment of the present disclosure.

Referring to FIG. 11, the sensing unit 600 senses the distance between the vehicle 2 and a driver in step S210. More specifically, the sensing unit 600 senses the distance between the vehicle 2 and a portable terminal carried by the driver through the distance sensor 620. The distance sensor 620 may include a GPS to sense the relative bearing and relative distance of the driver's portable terminal with respect to the vehicle 2. When an RKE (Remote Keyless Entry) or PKE (Passive Keyless Entry) signal for wirelessly opening or closing the door of the vehicle from a remote location is received from the portable terminal of the driver, the distance sensor 620 may sense that the driver has approached the vehicle 2 within a predetermined distance.

The control unit 700 determines whether the distance between the vehicle 2 and the driver, sensed in step S210, is less than the second distance, in step S220.

When determining in step S220 that the distance between the vehicle 2 and the driver is less than the second distance, the control unit 700 determines whether the ignition switch of the vehicle 2 is turned on/off, in step S230.

When determining in step S230 that the ignition switch of the vehicle 2 is turned on, the control unit 700 operate the flap unit 300 and the light emitting unit 200 to generate a welcome signal in step S240. The control unit 700 may flicker the turn indicator 3 a preset number of times before operating the flap unit 300 and the light emitting unit 200. The present number of times may be exemplified as two.

Figure 12:
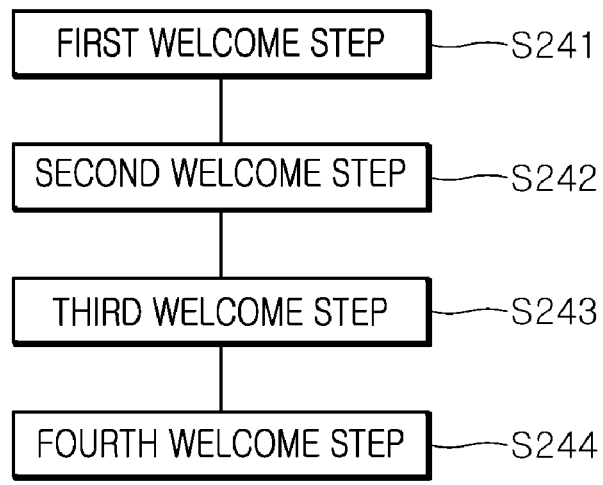
FIG. 12 is a flowchart schematically illustrating a process in which a flap unit and a light emitting unit generate a welcome signal, in accordance with an embodiment of the present disclosure.

FIG. 12 is a flowchart schematically illustrating a process in which the flap unit and the light emitting unit generate a welcome signal, in accordance with the embodiment of the present disclosure.

Referring to FIG. 12, step S240 of generating the welcome signal includes a first welcome step S241, a second welcome step S242, a third welcome step S243, and a fourth welcome step S244.

Figure 13:
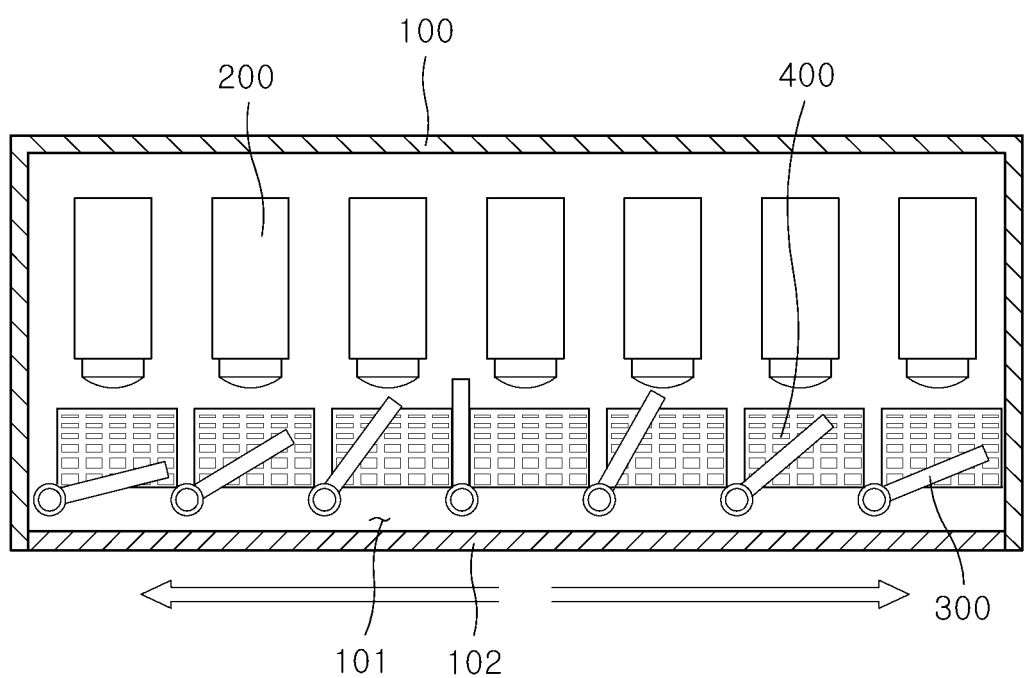
FIG. 13 is an operation diagram schematically illustrating an operation process of a first welcome step in accordance with the embodiment of the present disclosure.

FIG. 13 is an operation diagram schematically illustrating an operation process of the first welcome step in accordance with the embodiment of the present disclosure.

In the first welcome step S241, the control unit 700 opens the opening 101 by sequentially rotating the plurality of flap units 300 from the center of the opening 101 toward both ends of the opening 101. More specifically, the control unit 700 first rotates the flap unit 300 disposed in the center of the opening 101. Then, the control unit 700 sequentially rotates the flap units 300 disposed on the left and right sides of the flap unit 300 disposed in the center of the opening 101, with a predetermined time difference provided therebetween. Thus, the opening 101 is opened in such a shape that spreads from the center thereof toward both ends thereof.

Figure 14:
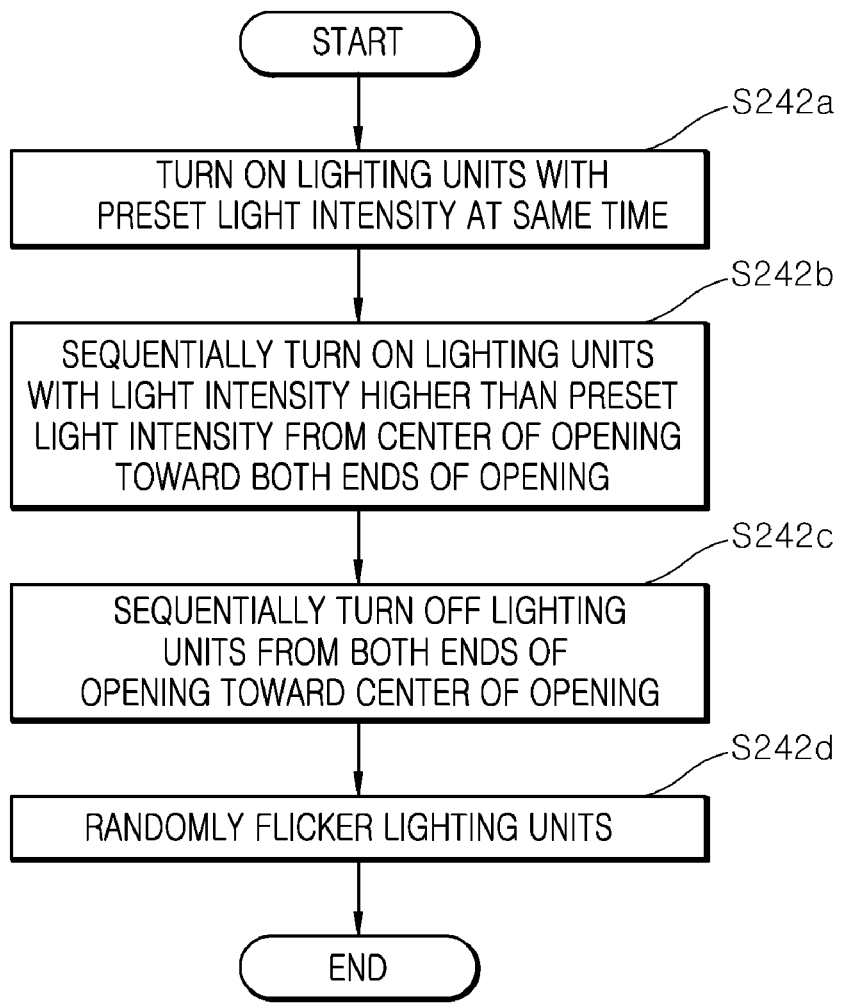
FIG. 14 is a flowchart schematically illustrating a second welcome step in accordance with the embodiment of the present disclosure.
Figure 15A:
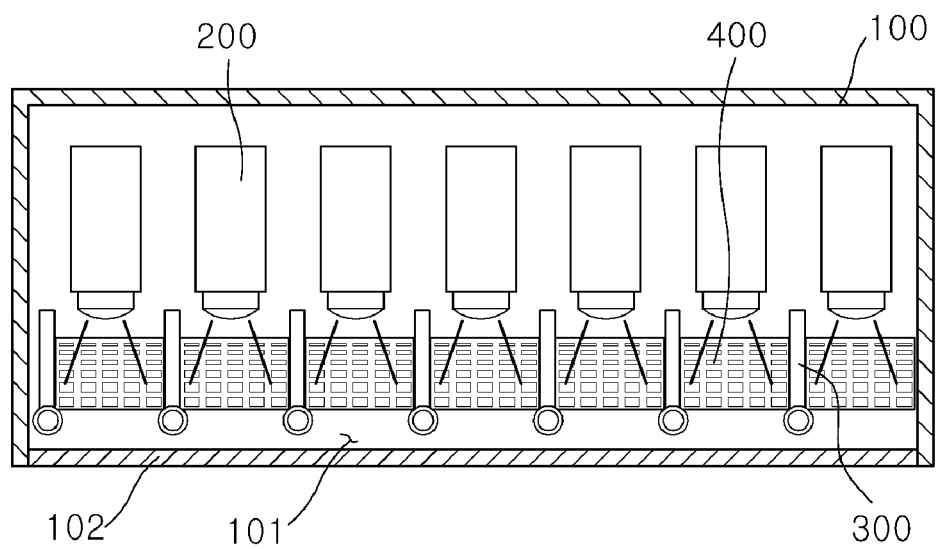
FIGS. 15A to 15D are operation diagrams schematically illustrating an operation process of the second welcome step in accordance with the embodiment of the present disclosure.
Figure 15B:
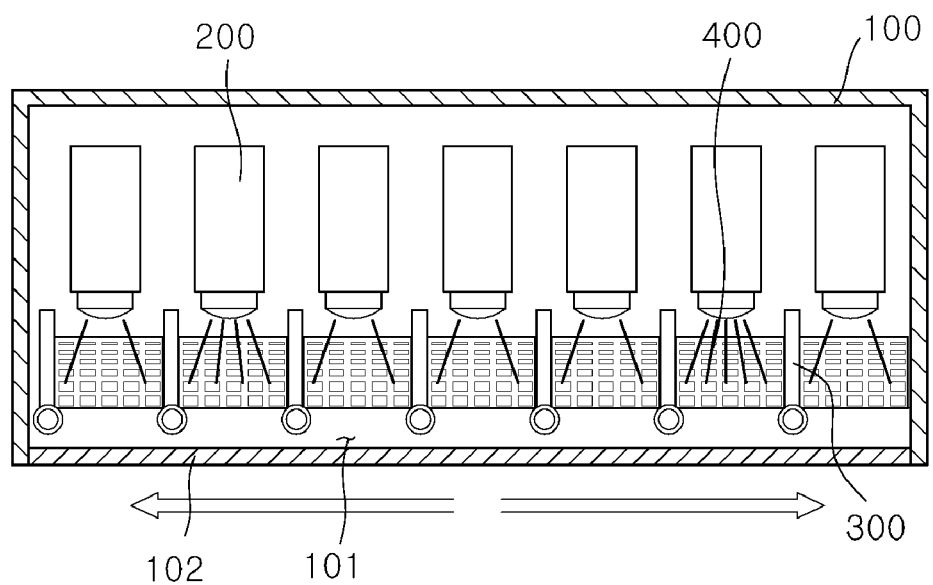
Figure 15C:
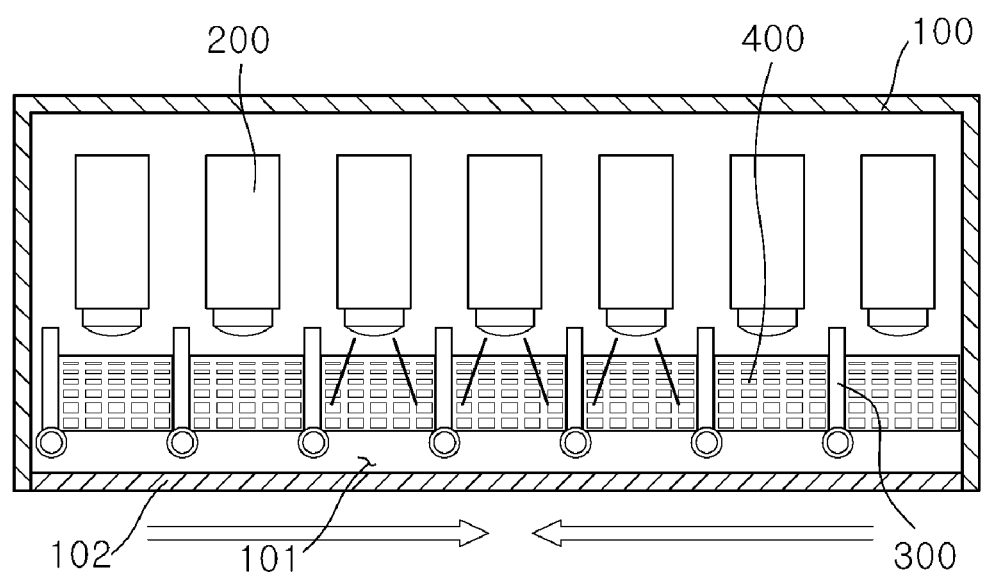
Figure 15D:
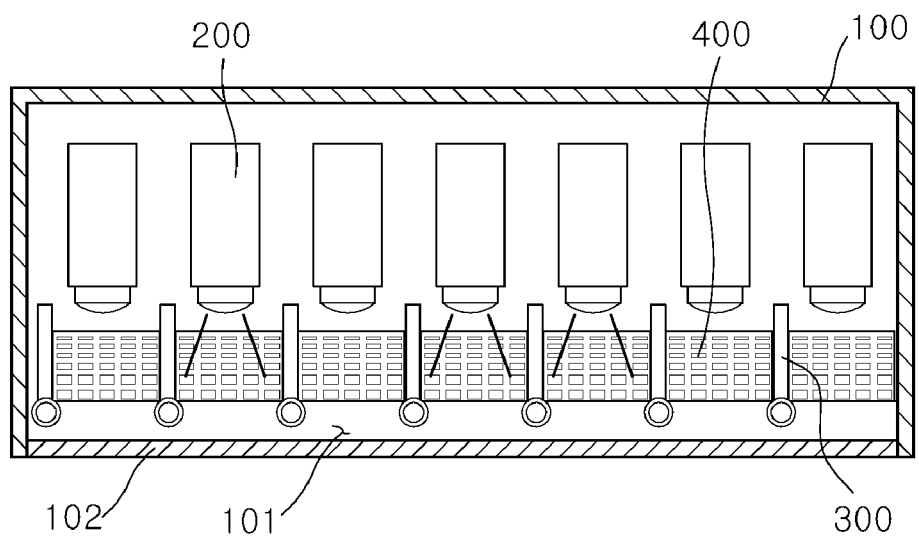

FIG. 14 is a flowchart schematically illustrating the second welcome step in accordance with the embodiment of the present disclosure, and FIGS. 15A to 15D are an operation diagram schematically illustrating the operation process of the second welcome step in accordance with the embodiment of the present disclosure.

In the second welcome step S242, the control unit 700 turns on or off the plurality of light emitting units 200 with the opening 101 opened by the flap units 300.

More specifically, the control unit 700 turns on the plurality of light emitting units 200 with a preset light intensity at the same time in step S242a. The preset light intensity may be exemplified as 70% of the maximum light intensity of the light emitting unit 200.

The control unit 700 sequentially turns on the plurality of light emitting units 200 from the center of the opening 101 toward both ends thereof with a light intensity higher than the preset light intensity, in step S242b. That is, the control unit 700 sequentially turns on the light emitting units 200 disposed on the left and right sides of the light emitting unit 200 disposed in the center of the opening 101 with a light intensity higher than the preset light intensity, with predetermined time differences provided therebetween. Therefore, the light emitting units 200 are turned on in such a shape that spreads from the center toward both ends of the opening 101. In this case, the light intensity higher than the preset light intensity may be exemplified as the maximum light intensity of the light emitting unit 200.

The control unit 700 sequentially turns off the plurality of light emitting units 200 from both ends of the opening 101 toward the center of the opening 101 in step S242c. That is, the control unit 700 sequentially turns off the plurality of light emitting units 200 from the light emitting units 200 disposed at both ends of the opening 101 toward the light emitting unit 200 disposed in the center of the opening 101, with predetermined timed differences provided therebetween. Thus, the light emitting units 200 are turned off in such a shape that converges from both ends of the opening 101 toward the center of the opening 101.

The control unit 700 randomly flickers the plurality of light emitting units 200. That is, the control unit 700 turns on some light emitting units 200, which are randomly selected while the plurality of light emitting units 200 are all turned off, and then turns off some of the light emitting units 200.

Figure 16:
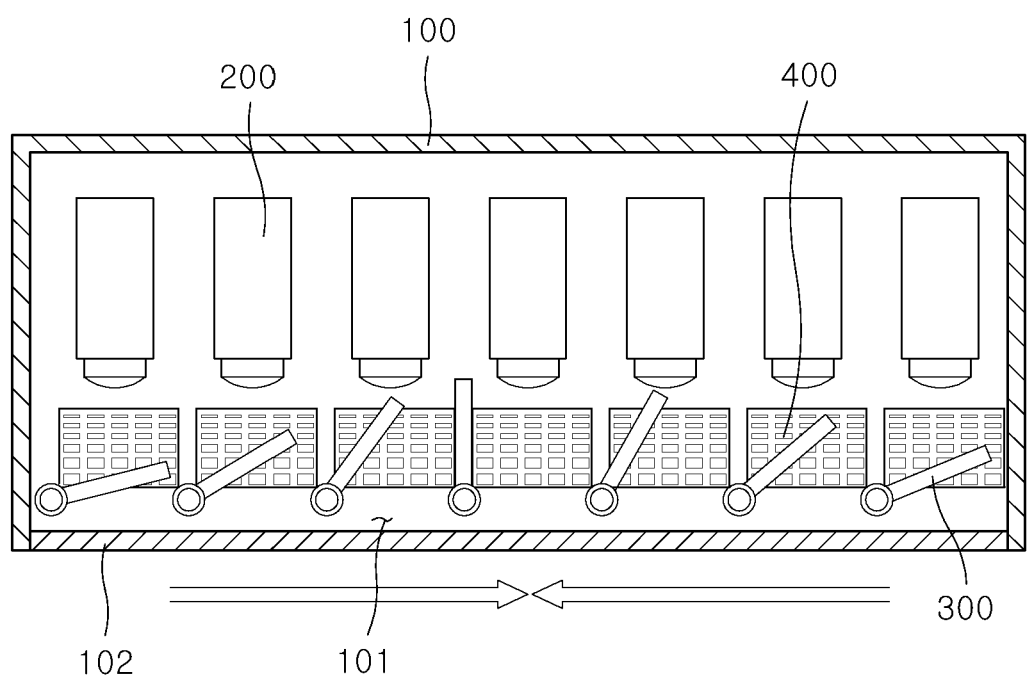
FIG. 16 is an operation diagram schematically illustrating an operation process of a third welcome step in accordance with the embodiment of the present disclosure.

FIG. 16 is an operation diagram schematically illustrating an operation process of the third welcome step in accordance with the embodiment of the present disclosure.

In the third welcome step S243, the control unit 700 closes the opening 101 by sequentially rotating the plurality of flap units 300 from both ends of the opening 101 toward the center of the opening 101. More specifically, while the opening 101 is opened, the control unit 700 rotates the plurality of flap units 300 from the flap units 300 disposed at both ends of the opening 101 toward the flap unit 300 disposed in the center of the opening 101, with predetermined time differences provided therebetween. Therefore, the opening 101 is closed in such a shape that converges from both ends thereof toward the center thereof.

Figure 17:
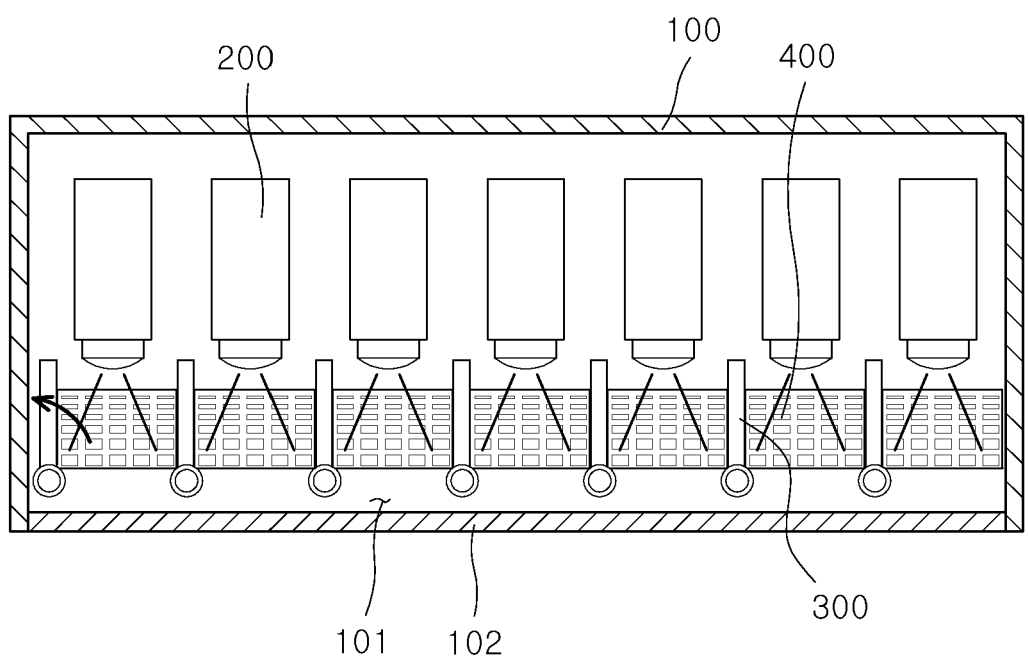
FIG. 17 is an operation diagram schematically illustrating an operation process of a fourth welcome step in accordance with the embodiment of the present disclosure.

FIG. 17 is an operation diagram schematically illustrating an operation process of the fourth welcome step in accordance with the embodiment of the present disclosure.

In the fourth welcome step S244, the control unit 700 opens the opening 101 by rotating the plurality of flap units 300 at the same time, and turns on the plurality of light emitting units 200 at the same time. That is, the control unit 700 rotates the plurality of flap units 300 such that the opening 101 closed by the plurality of flap units 300 is opened at once in the widthwise direction of the housing 100, and turns on the plurality of light emitting units 200 such that lights are simultaneously emitted to the outside of the vehicle through the opening 101. In this case, the light intensities of the light emitting units 200 may gradually rise to the maximum light intensity with a predetermined time difference.

After the fourth welcome step S244, when the control unit 700 determines that the illuminance value outside the vehicle, sensed by the illuminance sensor 630 of the sensing unit 600, exceeds the preset illuminance value, the control unit 700 may additionally perform a step of closing the opening 101 by rotating the plurality of flap units 300 at the same time, and turning off the plurality of light emitting units 200 at the same time.

When determining in step S220 that the distance between the vehicle 2 and the driver exceeds the second distance, the control unit 700 determines whether the ignition switch of the vehicle 2 is turned on/off, in step S250.

When determining in step S250 that the ignition switch of the vehicle 2 is turned off, the control unit 700 operate the flap unit 300 and the light emitting unit 200 to generate a goodbye signal in step S260. The control unit 700 may flicker the turn indicator 3 a preset number of times before operating the flap unit 300 and the light emitting unit 200. The present number of times may be exemplified as two.

Figure 18:
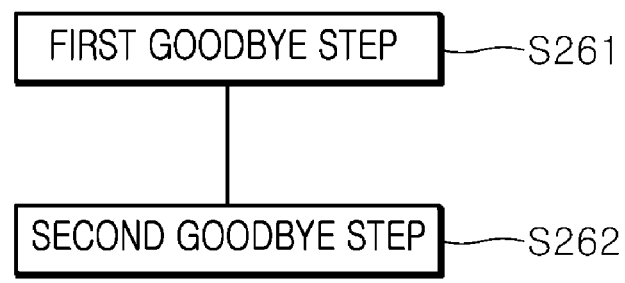
FIG. 18 is a flowchart schematically illustrating a process in which the flap unit and the light emitting unit generate a goodbye signal, in accordance with the embodiment of the present disclosure.

FIG. 18 is a flowchart schematically illustrating a process in which the flap unit and the light emitting unit generate a goodbye signal, in accordance with the embodiment of the present disclosure.

Step S260 of generating the goodbye signal includes a first goodbye step S261 and a second goodbye step S262.

Figure 19:
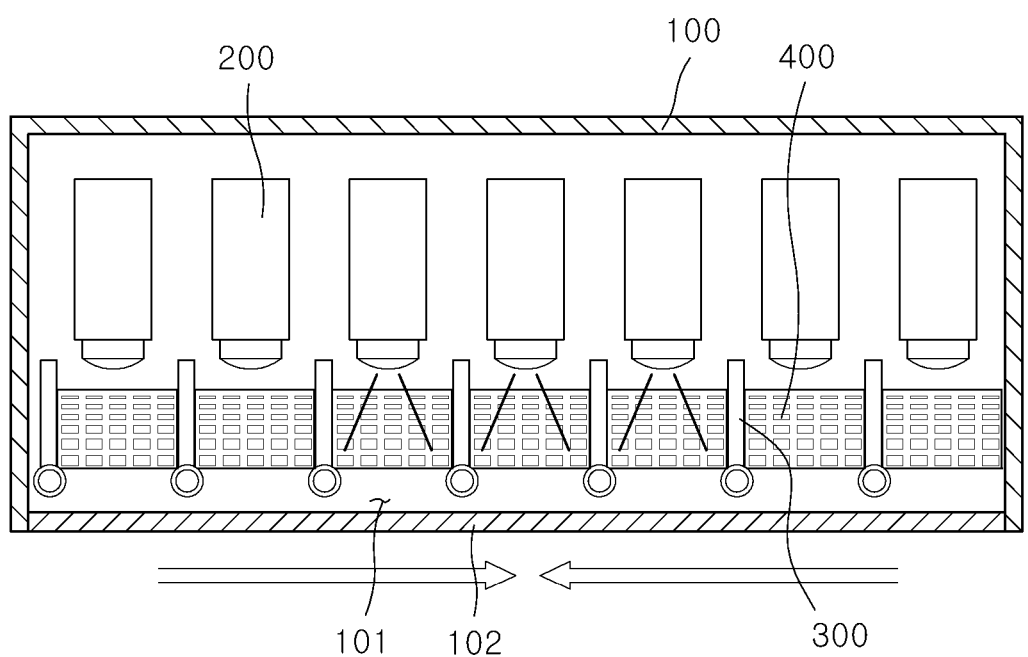
FIG. 19 is an operation diagram schematically illustrating an operation process of a first goodbye step in accordance with the embodiment of the present disclosure.

FIG. 19 is an operation diagram schematically illustrating the operation process of the first goodbye step in accordance with the embodiment of the present disclosure.

In the first goodbye step S261, the control unit 700 sequentially turns off the plurality of light emitting units 200 from both ends of the opening 101 toward the center of the opening 101. That is, the control unit 700 sequentially turns off the plurality of light emitting units 200 from the light emitting units 200 disposed at both ends of the opening 101 toward the light emitting unit 200 disposed in the center of the opening 101, with predetermined time differences provided therebetween. Thus, the light emitting units 200 are turned off in such a shape that converges from both ends of the opening 101 toward the center of the opening 101.

Figure 20:
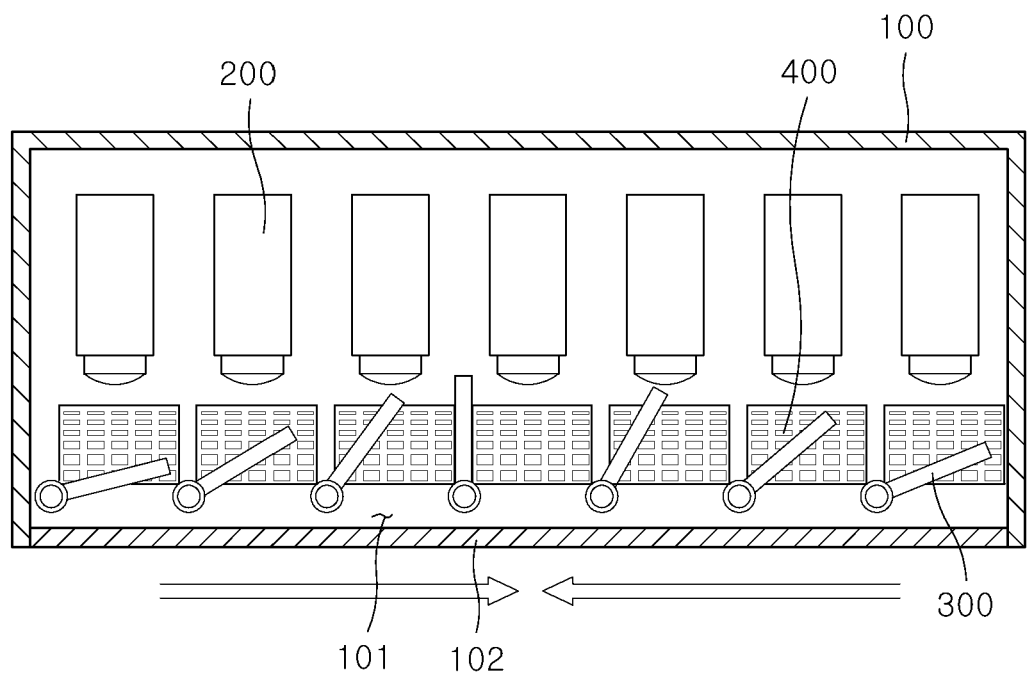
FIG. 20 is an operation diagram schematically illustrating an operation process of a second goodbye step in accordance with the embodiment of the present disclosure.

FIG. 20 is an operation diagram schematically illustrating an operation process of the second goodbye step in accordance with the embodiment of the present disclosure.

In the second goodbye step S262, the control unit 700 closes the opening 101 by sequentially rotating the plurality of flap units 300 from both ends of the opening 101 toward the center of the opening 101. More specifically, while the opening 101 is opened, the control unit 700 rotates the plurality of flap units 300 from the flap units 300 disposed at both ends of the opening 101 toward the flap unit 300 disposed in the center of the opening 101, with predetermined time differences provided therebetween. Therefore, the opening 101 is closed in such a shape that converges from both ends thereof toward the center thereof.

After the second goodbye step S262, the control unit 700 may additionally perform a step of turning off the daytime running light 4.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A method for controlling a lighting apparatus for a vehicle, the light apparatus comprising a light emitting unit and a flap system comprising a plurality of flap units, each flap unit configured to rotate to open or close a respective one of a plurality of openings exposing the light emitting unit, the method comprising:
    sensing a first distance between the vehicle and a pedestrian;
    determining whether the first distance is less than a second distance;
    in response to determining that the first distance is less than the second distance, determining a walking direction of the pedestrian; and
    controlling the plurality of flap units to collectively indicate the determined walking direction of the pedestrian,
    wherein controlling the plurality of flap units comprises controlling the plurality of flap units to sequentially rotate such that the plurality of openings is sequentially opened and then closed in a direction corresponding to the walking direction of the pedestrian;
    wherein the light apparatus further comprises (1) a display unit configured to display a color and (2) a reflecting unit configured to reflect the color displayed on the display unit, and
    wherein the method further comprises performing, while the plurality of openings is sequentially opened and then closed, (1) controlling the display unit to display the color, and (2) controlling the reflecting unit to reflect the color displayed by the display unit.

2. The method of claim 1, wherein:
    light emitted from the light emitting unit has a first color, and the plurality of flap units has a second color, and
    color inversion occurs between the first and second colors when the plurality of flap units is rotated to open or close the openings.

3. The method of claim 1, further comprising determining whether the vehicle is traveling.

4. The method of claim 1, wherein the method further comprises turning on or off the light emitting unit based on an illuminance value outside the vehicle.

5. A method for controlling a lighting apparatus of a vehicle, the light apparatus comprising (1) a plurality of light emitting units, (2) a plurality of openings respectively exposing the plurality of light emitting units, and (3) a plurality of flap units configured to rotate to open or close the plurality of openings, respectively, the method comprising:
    sensing a first distance between the vehicle and a driver outside the vehicle;
    determining whether the first distance is less than a second distance;
    in response to the first distance being less than the second distance, controlling the plurality of light emitting units and the plurality of flap units to generate a welcome signal; and
    in response to the first distance being not less than the second distance, controlling the plurality of light emitting units and the plurality of flap units to generate a goodbye signal,
    wherein the method further comprises determining whether an ignition switch of the vehicle is turned on or turned off, and
    wherein controlling the plurality of light emitting units and the plurality of flap units to generate the welcome signal comprises:
        in response to determining that the ignition switch is turned on, controlling the plurality of flap units to sequentially rotate to expose the opening sequentially from a center of the opening toward both ends of the opening;
        turning on or off the plurality of light emitting units while the opening is opened;
        sequentially rotating the plurality of flap units to close the opening from both ends of the opening toward the center of the opening; and
        rotating the plurality of flap units to open the opening and turning on the plurality of light emitting units.

6. The method of claim 5, wherein turning on or off the plurality of light emitting units while the opening is opened comprises:
    simultaneously turning on the plurality of light emitting units at a first light intensity;
    sequentially turning on the plurality of light emitting units from the center of the opening toward both ends of the opening at a second light intensity higher than the first light intensity;
    sequentially turning off the plurality of light emitting units from both ends of the opening toward the center of the opening; and
    randomly flickering the plurality of light emitting units.

7. The method of claim 5, wherein controlling the plurality of light emitting units and the plurality of flap units to generate the welcome signal further comprises, after rotating the plurality of flap units to open the opening and turning on the plurality of light emitting units, simultaneously turning off the plurality of light emitting units when an illuminance value outside the vehicle exceeds a preset illuminance value.

8. The method of claim 5, wherein controlling the plurality of light emitting units and the plurality of flap units to generate the welcome signal further comprises flicking a turn indicator a number of times.

9. The method of claim 5, wherein controlling the plurality of light emitting units and the plurality of flap units to generate the goodbye signal comprises:
    in response to the ignition switch being turned off, sequentially turning off the plurality of light emitting units from both ends of the opening toward a center of the opening; and sequentially rotating the plurality of flap units to close the opening from both ends of the opening toward the center of the opening.

10. The method of claim 9, wherein controlling the plurality of light emitting units and the plurality of flap units to generate the goodbye signal further comprises flicking a turn indicator a preset number of times.

11. The method of claim 5, wherein:
light emitted from the plurality of light emitting units has a first color, and the plurality of flap units has a second color, and
color inversion occurs between the first and second colors when the plurality of flap units are rotated to open or close the opening.

12. A method for controlling a lighting apparatus of a vehicle, the light apparatus comprising (1) a plurality of light emitting units, (2) a plurality of openings respectively exposing the plurality of light emitting units, and (3) a plurality of flap units configured to rotate to open or close the plurality of openings, respectively, the method comprising:
sensing a first distance between the vehicle and a driver outside the vehicle;
determining whether the first distance is less than a second distance;
in response to the first distance being less than the second distance, controlling the plurality of light emitting units and the plurality of flap units to generate a welcome signal; and
in response to the first distance being not less than the second distance, controlling the plurality of light emitting units and the plurality of flap units to generate a goodbye signal,
wherein the light apparatus further comprises (1) a display unit configured to display a color and (2) a reflecting unit configured to reflect the color displayed on the display unit, and
wherein the method further comprises:
controlling the plurality of flap units to sequentially rotate such that the plurality of openings are sequentially opened and then closed; and
performing, while the plurality of openings are sequentially opened and then closed, (1) controlling the display unit to display a first color, and (2) controlling the reflecting unit to reflect the first color displayed by the display unit.

* * * * *